United States Patent [19]

Hamada et al.

[11] Patent Number: 4,881,193
[45] Date of Patent: Nov. 14, 1989

[54] RATIONAL NUMBER OPERATION UNIT FOR REDUCTION

[75] Inventors: Hozumi Hamada, Chofu; Hiraku Nakano, Hadano, both of Japan

[73] Assignee: Hitachi, Ltd., Tokyo, Japan

[21] Appl. No.: 84,330

[22] Filed: Aug. 11, 1987

[30] Foreign Application Priority Data

Sep. 4, 1986 [JP] Japan .................................. 61-208649
Sep. 5, 1986 [JP] Japan .................................. 61-209016

[51] Int. Cl.$^4$ .............................................. G06F 7/50
[52] U.S. Cl. ................................ 364/761; 364/715.01
[58] Field of Search ................................ 364/761–766, 364/767, 746, 715.01

[56] References Cited

U.S. PATENT DOCUMENTS

| | | | |
|---|---|---|---|
| 3,378,677 | 4/1968 | Waldecker et al. | 364/766 |
| 3,508,038 | 4/1970 | Goldschmidt et al. | 364/765 |
| 4,488,247 | 12/1984 | Inagami et al. | 364/765 |
| 4,707,798 | 11/1987 | Nakano | 364/765 |
| 4,725,974 | 2/1988 | Kanazawa | 364/765 |
| 4,760,550 | 7/1988 | Katzmann et al. | 364/761 X |

FOREIGN PATENT DOCUMENTS 171535  9/1985  Japan .................................. 364/762

OTHER PUBLICATIONS

Chiu et al., "Binary Divide Mechanism", *IBM Technical Disclosure Bulletin*, vol. 19, No. 6, Nov. 1976, pp. 2015–2017.

"*Mathematics Dictionary*, 2nd Ed.", Edited by Japan Mathematics Association, pp. 531–532.

*Primary Examiner*—Eugene R. LaRoche
*Assistant Examiner*—Benny Lee

*Attorney, Agent, or Firm*—Fay, Sharpe, Beall Fagan, Minnich & McKee

[57] ABSTRACT

A rational number operation unit comprising division means which receives a rational number having numerator and denominator to be reduced for sequentially determining terms $d_1, d_2, \ldots$ of a continued fraction for the rational number $$d_1 + \cfrac{1}{d_2} + \cfrac{1}{d_3} + \cfrac{1}{d_4} + \cdots$$

or data $S_1, S_2, \ldots$, the division means carrying out a first division for the numerator as a dividend and the denominator as a divisor, producing a quotient thereof as the first term $d_1$ or the dependent data $S_1$, carrying out a second division for a residue thereof as a new divisor and the divisor in the first division as a new dividend, producing a quotient thereof as the second term $d_2$ or depending data $S_2, \ldots$, carrying out an (i+1)th division for a residue of the i-th division as a new divisor and the divisor in the i-th division as a new dividend, producing a quotient thereof as the term $d_{i+1}$ or depending data $S_{i+1}$, calculation means responsive to the term $d_i$ or depending data $S_i$ for calculating $$P_i = P_{i-2} + d_i P_{i-1}$$

$$Q_i = Q_{i-2} + d_i Q_{i-1}$$

where $P_i$ and $Q_i$ are numerator and denominator of an i-th approximate fraction of the rational number, and output means for determining if the residue of the division is zero, and outputting Pi/Qi of the i-th approximate fraction as a reduced result of the rational number when the residue is zero.

10 Claims, 5 Drawing Sheets

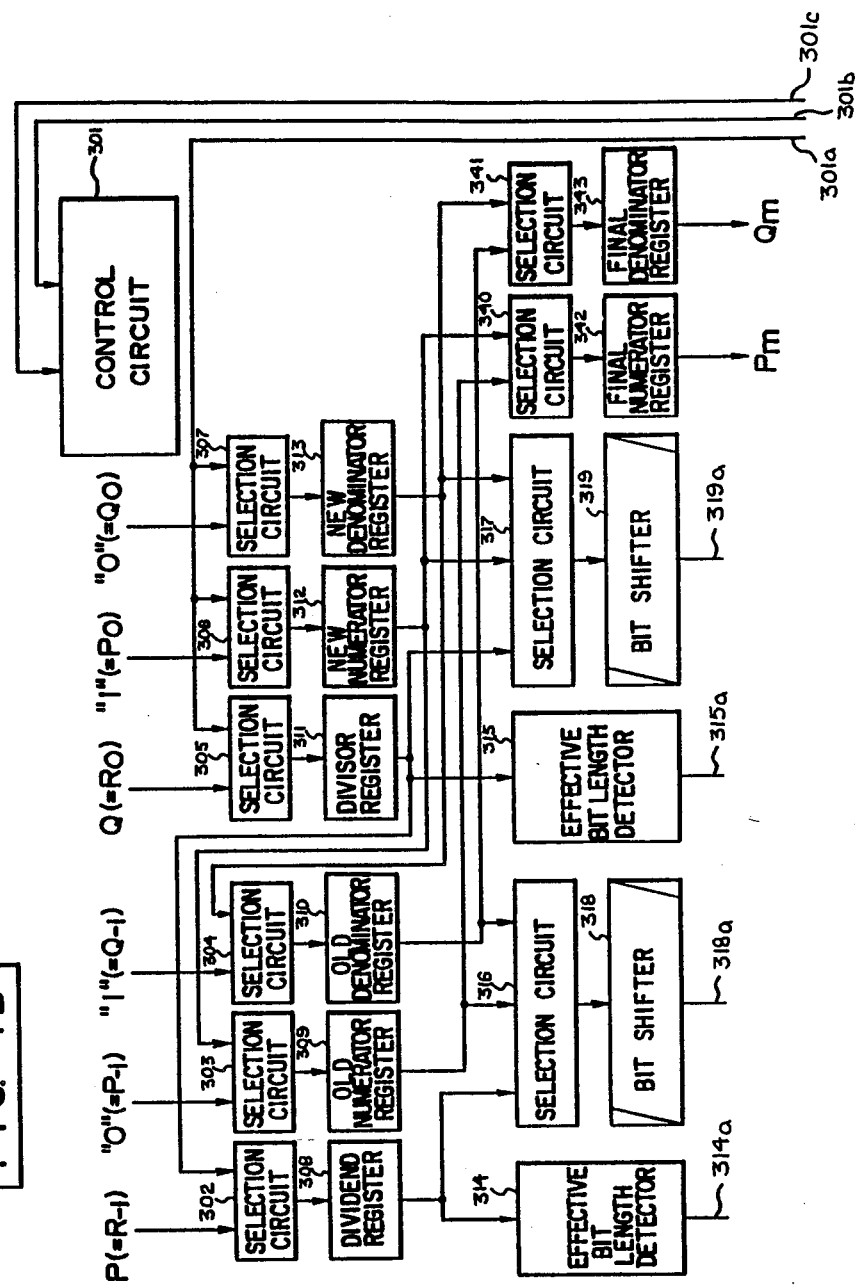

RATIONAL NUMBER OPERATION UNIT FOR REDUCTION

BACKGROUND OF THE INVENTION

The present invention relates to a rational number operation unit for reducing a rational number.

Numerals handled in a computer have been, in many cases, integers and real numbers, but in a recent computer, a mathematical formula is handled and an operation to a rational number is required in a certain application field.

An operation instruction handled in the computer usually specified an operation code, a first operand and a second operand and the specified operation is carried out for those operands. The add/subtract/multiply/divide operations of rational numbers can be theoretically carried out only by combination of operations of integers. For example, when the first operand is a/b and the second operand is c/d (where a, b, c and d are integers), the add/subtract/multiply/divide operations are carried out in the following manner. A result of addition is (ad+bc)/bd, a result of subtraction is (ad-bd)/bd, a result of multiplication is ac/bd and a result of division is ad/bc. In the computer, the numbers of digits of numerator and denominator are frequently limited. The numbers of digits of the numerator and denominator of the results of the add/subtract/multiply/divide operations may be within the limit and a result of operation may not be within the limit. For example, in the addition, if both the denominators b and d are m digits, the product b.d thereof is of 2m digits which is not within the limit m.

A method to render both the numerator and denominator no longer than the predetermined number of digits is to reduce the numerator and denominator. In a known method to reduce the rational number, a greatest common measure of the numerator and denominator is determined by an Euclid mutual division method and the numerator and denominator are divided by the greatest common measure. In this method, the reduction is principally possible but since the number of times of division is large, it is not a practical method. It cannot attain a high speed operation.

SUMMARY OF THE INVENTION

It is an object of the present invention to provide a rational number operation unit which resolves the problems encountered in the prior art unit and allows high speed reduction of numerator and denominator of a rational number.

It is another object of the present invention to provide a rational number operation unit which, if numerator and denominator are not within a predetermined number of digits after the reduction, calculates a rational number which precisely approximates the original rational number and having numerator and denominator which are within the predetermined number of digits.

In order to achieve the above object, the rational number operation unit of the present invention comprises division means which receives a rational number having numerator and denominator to be reduced for sequentially determining terms $d_1, d_2, \ldots$ of a continued fraction $$d_1 + \cfrac{1}{d_2 + \cfrac{1}{d_3 + \cfrac{1}{d_4 + \cdots}}}$$

for the rational number or data $S_1, S_2, \ldots$ uniquely depending on those terms, the division means carrying out a first division for the numerator as a dividend and the denominator as a divisor, producing a quotient thereof as the first term $d_1$ or the dependent data $S_1$, carrying out a second division for a residue thereof as a new divisor and the divisor in the first division as a new dividend, producing a quotient thereof as the second term $d_2$ or depending data $S_2, \ldots$, carrying out an (i+1)th division for a residue of the i-th division as a new divisor and the divisor in the i-th division as a new dividend, producing a quotient thereof as the term $d_{i+1}$ or depending data $S_{i+1}$, calculation means responsive to the term $d_i$ or depending data $S_i$ for calculating $$P_i = P_{i-2} + d_i P_{i-1}$$

$$Q_i = Q_{i-2} + d_i Q_{i-1}$$

where $P_i$ and $Q_i$ are numerator and denominator of an i-th approximate fraction of the rational number, based on the quotient $d_i$ or depending data $S_i$ and previously calculated $P_{i-1}$, $P_{i-2}$, $Q_{i-1}$ and $Q_{i-2}$, and output means for checking whether the residue of the division by the division means is zero or not, and when it is zero, outputting the numerator $P_i$ and the denominator $Q_i$ of th i-th approximate fration calculated by the calculation means as a reduced result of the rational number.

In the present invention, the operation unit is characterized by means for checking whether at least one of the numerator $P_i$ and the denominator $Q_i$ of the i-th approximate fraction calculated by the calculation means exceeds a predetermined number of digits or not, and means responsive to an affirmative decision of the above means for producing the numerator $P_{i-1}$ and the denominator $Q_{i-1}$ of the (i-1)th approximate fraction as a reduced result of the rational number.

In accordance with the present invention, the terms $d_1, d_2, \ldots$, for the rational number having the numerator and denominator to be reduced are sequentially calculated by the division means. Each time the division means produces the term $d_i$ of the continued fraction, the calculation means calculates the numerator $P_i$ and the denominator $Q_i$ of the rational number (approximate rational number) which approximates the original rational number. When the approximater rational number is fully developed into the continued fraction, it corresponds to the original rational number, and if the original rational number is reducible, the approximate rational number is a reduced version of the numerator and denominator of the original rational number. Accordingly, if the original rational number is reducible, when the development into the continued fraction is completed, the approximate rational number $P_m/Q_m$ so far produced is provided as the reduced result. By providng means for checking whether the numerator $P_i$ or denominator $Q_i$ of the approximate rational number exceeds a predetermined number of digits or not, if the check means detects that $P_m$ or $Q_m$ exceeds the predetermined number of digits before the development into the continued fraction is completed, the numerator $P_{m-1}$ and the denominator $Q_{m-1}$ so far calculated are outputted as the approximate rational number.

DESCRIPTION OF THE PREFERRED EMBODIMENTS

Figure 1:
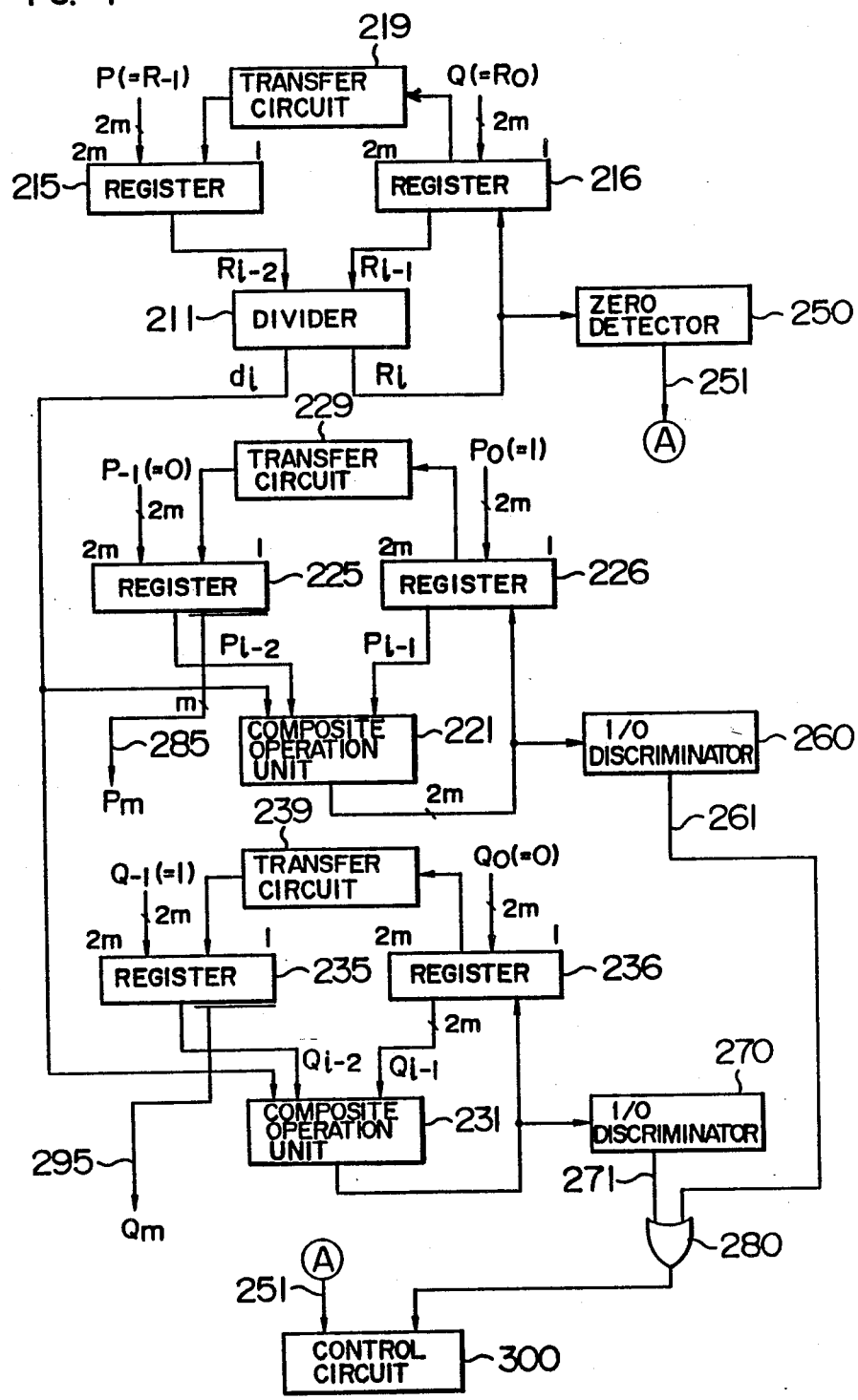
FIG. 1 shows a block diagram of a first embodiment of a rational number operation unit of the present invention.

A principle of the present invention is explained prior to the embodiments.

Various natures of the continued fraction are described in "Mathematics Dictionary" 2nd Edition, edited by Japan Mathematics Association, pages 531–532, published by Iwanami Shoten.

The continued fraction is inherently used to approximate an irrational number by a rational number. The present invention is based on the finding that a continued fraction is also effective to reduce a rational number or determine an approximate rational number of the original rational number. A continued fraction of a real number r is expressed by $$r = d_1 + \cfrac{a_2}{d_2 + \cfrac{a_3}{d_3 + \cfrac{a_4}{d_4 + \ldots}}} \quad (1)$$

Let us assume that $a_2 = \ldots = 1$ (regular continued fraction).

Since the formula (1) occupies a large space, the following abbreviated expression is used.

$$r = d_1 + \cfrac{1}{\lceil d_2} + \cfrac{1}{\lceil d_3} + \cfrac{1}{\lceil d_4} + \ldots \quad (1)'$$

The term $d_i$ is determined by sequentially determining $d_i$, $s_i$ and $r_i$ by a formula (2) ($i = 1, 2, 3, \ldots, r_0 = r$)

$$d_i = [r_{i-1}] \text{ (where [ ] is a gauss symbol)}$$
$$s_i = r_{i-1} - d_i \quad (2)$$
$$r_i = 1/s_i$$

where $0 \leq s_i > 1$

Namely, the real number r is divided into an integer portion $d_1$ and a decimal portion $s_1$, a reciprocal $r_1$ of the decimal portion $s_1$ is divided into an integer portion $d_2$ and a decimal portion $s_2$, a reciprocal $r_2$ of only the new decimal portion $s_2$ is divided into an integer portion $d_3$ and a decimal portion $s_3$, and the same operation is carried out for a reciprocal $r_3$ of only the decimal portion $s_3$, and so on.

A condition for upper and lower limits of $s_i$ is to maintain unity of the left side $s_i$ of the formula (2). The above development is terminated when $s_i = 0$. It has been known that if the real number r is a rational number, it is terminated in a definite number of times.

For a sequence of integers derived from the above development, $d_1, d_2, d_3, \ldots, d_m$, the sequence $d_1$ to $d_m$ is considered. The subsequent terms $d_{m+1}, \ldots$ may not exist. Numerator and denominator of a rational number derived from a continued fraction comprising the terms $d_1$ to $d_m$ are represented by $P_m$ and $Q_m$.

$$\frac{P_m}{Q_m} = d_1 + \cfrac{1}{\lceil d_2} + \ldots + \cfrac{1}{\lceil d_m} \quad (3)$$

The fraction $P_m/Q_m$ is called an m-th approximate fraction to the original real number r.

It is known that formulas (4) and (5) may be used to determine the numerator $P_m$ and the denominator $Q_m$.

$$P_i = P_{i-2} + d_i P_{i-1} \quad (4)$$

$$Q_i = Q_{i-2} + d_i Q_{i-1} \quad (5)$$

where $i = 1, 2, \ldots$ and the following initial condition must be met.

$$P_{-1} = Q_0 = 0, P_0 = Q_{-1} = 1 \quad (6)$$

It has been proved that $P_i$ and $Q_i$ have the following characteristics.

(1) The rational number $P_m/Q_m$ having the numerator $P_m$ and the denominator $Q_m$ determined by the above formulas is a simple fraction.

(2) There is no rational number which approximates the original real number r better than $P_m/Q_m$, in rational numbers whose denominator absolute values are smaller than an absolute value of $Q_m$. Namely, $P_m/Q_m$ is a simple fraction which best approximates the real number r.

The present invention makes use of the following characteristics (3) and (4) of the m-th approximate fraction.

(3) If the real number r is a rational number P/Q having a numerator P and a denominator Q, and if the development of the rational number P/Q into a continued fraction ends with a term $d_m$, $P_m$ and $Q_m$ provide a reduced fraction of the rational number P/Q in accordance with the characteristic (1). If the original rational number P/Q and its simple fraction are of the same value, the sequence $d_1, d_2, \ldots, d_m, \ldots$ derived from the continued fraction development are equal, and the rational number $P_m/Q_m$ derived by applying the terms $d_1$ to $d_m$ to the formulas (4) and (5) is the simple fraction and hence $P_m/Q_m$ is the reduced fraction of the original rational number P/Q. Accordingly, the reduced fraction of the rational number P/Q is derived by developing it into the continued fraction, and determining the approximate fraction $P_m/Q_m$ to the last term $d_m$ of the continued fraction development.

(4) If the number of digits of one of $P_m$ and $Q_m$ for a certain term preceding to the last term of the continuous fraction of P/Q exceeds a predetermined range, the preceding approximate fraction $P_{m-1}/Q_{m-1}$ may be used as a best approximate rational number having numerator and denominator which do not exceed the predetermined number of digits.

The present invention further makes use of the fact that the following method is suitable for high speed operation, in place of the method relating to the formula (2), namely, in the formula (2), $$R_i = R_{i-2} - d_i R_{i-1} \quad (7)$$

if $r_1 = R_{i-1}/R_i$.

This formula indicates that when a division is carried out with a dividend $R_{i-2}$ and a divisor $R_{i-1}$, a quotient is $d_i$ and a residue is $R_i$. Accordingly, if an initial condition is $$R_{-1} = \text{numerator } P$$
$$R_0 = \text{denominator } Q \qquad (8)$$

the terms $d_i$ (i=1, 2, ...) of the continued fraction are derived as follows. A division is carried out with the numerator P as the dividend and the denominator Q as the divisor to produce a quotient $d_1$ and a residue $R_1$. Then, a division is carried out with the denominator $Q_1$ as the divisor and the residue $R_1$ as the dividend to produce a quotient $d_2$ and a residue $R_2$. Similarly, an (i+1)th division is carried out with divisor and residue in the i-th division as the dividend and divisor, respectively, to produce a term $d_{i+1}$ and a residue $R_{i+1}$. The iteration stops when the residue becomes zero.

As an examle, let us assume 30/21 (P=30, Q=21) as a rational number to be reduced.

An initial setting is:

$$P_{-1}=0, Q_{-1}=1, R_{-1}=30$$
$$P_0=1, Q_0=0, R_0=21$$

A result of a first division of the formula (3) is $30 \div 21 = 1$ (residue 9). Thus, $$d_1=1, R_1=9, P_1=1, Q_1=1 \qquad (9)$$

A result of a second division of the formula (9) is $21 \div 9 = 2$ (residue 3). Thus, $$d_2=2, R_2=3, P_2=3, Q_2=2 \qquad (10)$$

A result of a third division of the formula (9) is $9 \div 3 = 3$ (residue 0). Thus, $$d_3=3, R_3=0, P_3=10, Q_3=7 \qquad (11)$$

The iteration terminates at three times.

$P_1/Q_1$ and $P_2/Q_2$ are approximate rational numbers close to the original rational number 30/21, and the final value $P_3/Q_3 = 10/7$ corresponds to the reduced fraction of the original rational number 30/21. This is the nature of the continued fraction development. A remarkable feature is that those approximate rational numbers are not obtained after all terms $d_1, d_2, d_3, \ldots$ have been obtained, but each time $d_i$ is obtained, a closer approximate rational number is obtained.

The present invention makes use of this feature. Namely, each time the term $d_i$ of the continued fraction of the rational number to be reduced is obtained, the numerator $P_i$ and denominator $Q_i$ of the approximate rational number are determined, and when the last term $d_m$ of the continued fraction is determined, the approximate rational number $P_m/Q_m$ therefor is outputted as a reduced fraction. Further, each time the term $d_i$ of the continued fraction development is obtained, the numbers of digits of $P_i$ and $Q_i$ are checked and if one of $P_i$ and $Q_i$ exceeds a predetermined range, the previous approximate fraction $P_{i-1}/Q_{i-1}$ is outputted.

Thus, when the continued fraction development is over, the reduced fraction is immediately outputted, and if the number of digits of $P_i$ or $Q_i$ exceeds the predetermined range before the continued fraction development is over, the best approximate rational number $P_{i-1}/Q_{i-1}$ is outputted. As seen from the formulas (4) and (5), $P_i$ and $Q_i$ may be independently determined. In the present embodiment, $P_i$ and $Q_i$ are determined by two concurrently operable operation units.

In order to simplify the operation unit, the condition of the formula (3) is loosened as follows.

$$-1 \leq s_i < 1 \qquad (12)$$

For the relation between $R_{i-1}$ and $R_i$, $$-|R_{i-1}| \leq R_i < |R_{i-1}| \qquad (13)$$

It has been known that this loosened condition does not change the property of the approximate number for the rational number $P_m/Q_m$ obtained by the formulas (4) and (5).

One embodiment of the present invention is explained with reference to the drawings. FIG. 1 shows a block diagram of the first embodiment of the rational number operation unit of the present invention.

In the present embodiment, a rational number P/Q to be reduced having a 2m-bit numerator P and a 2m-bit denominator Q is applied to the operation unit, which reduces it to produce a rational number having an m-bit numerator and m-bit denominator. If the number of bits of one of numerator $P_i$ and denominator $Q_i$ of an approximate rational number $P_i/Q_i$ exceeds m before the reduced fraction of the rational number P/Q is obtained, a previous rational number $P_{i-1}/Q_{i-1}$ is outputted as an approximate rational number. In the following description, all numeric data are expressed by 2's complements.

In FIG. 1, numerals 215 and 216 denote 2m-bit registers in which the numerator P and denominator Q of the rational number to be reduced are loaded as initial values, respectively, numeral 211 denotes a divider which carries out division of the formula (7) by using the data stored in the registers 215 and 216 as $R_{i-2}$ and $R_{i-1}$ of the formula (7), respectively, to produce a quotient $d_i$ and a residue $R_i$ in parallel, numeral 219 denotes a transfer circuit for transferring the data stored in the register 216 to the register 215 in parallel each time the divider 211 carries out the division, and numeral 250 denotes a zero detector which determines whether the residue $R_i$ produced by the divider 211 is "0" or not. Those elements are used to carry out the division of the formula (7) for each i to sequentially produce the terms $d_i$ (i=1, 2, ...) of the continued fraction of the rational number to be reduced.

Numerals 225 and 226 denote 2m-bit registers to which $P_{-1}$ and $P_0$ shown in the formula (6) are loaded as initial values, respectively, numeral 221 denotes a composite operation unit which calculates $P_i$ shown in the formula (4) by using the quotient $d_i$ supplied from the divider 211 and the data in the registers 225 and 226 as $P_{i-2}$ and $P_{i-1}$, respectively, and produces all bits thereof in parallel, numeral 260 denotes a 1/0 discriminator which determines whether high order (m+1) bits of $P_i$ calculated by the composite operation unit 221 are all "0" or "1", and numeral 229 denotes a transfer circuit which transfers the data stored in the register 226 to the register 225 each time the composite operation unit 221 calculates $P_i$. Those elements carries out the operation defined by the formula (4) for each i to produce $P_i$ (i=1, 2, ...).

Numerals 235 and 236 denote 2m-bit registers to which $Q_{-1}$ and $Q_0$ shown in the formula (6) are loaded as the initial values, respectively, numeral 231 denotes a composite operation unit which calculates $Q_i$ shown in the formula (5) by using the quotient $d_i$ supplied from the divider 211 and produces all bits thereof in parallel, numeral 270 denotes a 1/0 discriminator which determines whether high order (m+1) bits of $Q_i$ are all "0" or "1", and numeral 239 denotes a transfer circuit which transfer the data stored in the register 236 to the register 235 in parallel.

The operation of the operation unit of FIG. 1 is now explained.

The numerator P and denominator Q of the rational number to be reduced are loaded into the registers 215 and 216 as $R_{-1}$ and $R_0$ of the formula (7), respectively. Those data are of 2m-bit length. The divider 211 carries out the division with the data (P) in the register 215 as the divided $R_{-1}$ and the data (Q) in the register 216 as the divisor $R_0$. The quotient thereof is a first term of the continued fraction of the rational number P/Q as seen from the formula (7). The residue is $R_1$ as seen from the formula (7), and it is loaded into the register 216 as a new residue. The data which has been stored in the register 216 (Q in this case) is transferred to the register 215 by the transfer circuit 219 before the residue is loaded. In this manner, the residue $R_0$ (or Q) is loaded into the register 215 and the residue $R_1$ is loaded into the register 216. The "0" detector 250 determines whether the residue $R_i$ ($R_1$ in this case) supplied from the divider 211 is "0" or not, and if it is "0", produces the "1" output 251, which is supplied to the control circuit 300. If the output 251 is "1", it indicates the end of development into the continued fraction and no iteration of division is carried out by the control of the control circuit 300. If the output 251 is not "1", the divider 211 again carries out the division based on the data $R_0$ and $R_1$ in the registers 215 and 216 to produce $d_2$ and $R_2$ in accordance with the formula (7). The residue $R_1$ which has been stored in the register 216 is transferred to the register 215 by the transfer circuit 219 and the new residue $R_2$ is loaded into the register 216. The zero-detector 250 determines if the new residue $R_2$ is "0" or not. Similarly, the division is iterated to produce $d_i$ and $R_i$. The iteration is terminated when the residue $R_1$ and "0" or the output of one of the 1/0 discriminators 260 and 270 is "1".

Each time the term $d_i$ is calculated by the divider 211, $P_i$ shown in the formula (4) is calculated by the composite operation unit 221 in the following manner. $P_{-1}$ (=0) and $P_0$ (=1) shown in the formula (6) are loaded into the registers 225 and 226 as the initial values. The composite operation unit 221 calculates $P_1$ in accordance with the formula (4), that is, $P_1 = P_{-1} + d_1 \times P_0$, based on the data stored in those registers and the data $d_i$ supplied from the divider 211. Thereafter, the data in the register 226 ($P_0$ in this case) is transferred to the register 225 by the transfer circuit 229, and the calculated $P_1$ is loaded into the register 226. The output ($P_1$) of the divider 221 is of 2m-bit length, and the 1/0 discriminator 260 determines if high order (m+1) bits of the output ($P_1$) are all "0" or "1". If the high order (m+1) bits of the output ($P_1$) are neither all "0" nor "1", the 1/0 discriminator 260 produces the "1" output 261. Accordingly, if the number of effective digits of $P_1$ is no less than m, the output 261 is "1". Thus, the 1/0 discriminator 260 determines whether the number of effective digits of the output ($P_1$) of the divider 221 exceeds m bits or not. The output 261 of the discriminator 260 is supplied to the control circuit 300 through the OR gate 280. When the output 261 is "1", the calculation of the next term $d_2$ by the divider 211 is inhibited by the control circuit 300. When the output 261 is "0", the next term $d_2$ is calculated by the divider 211 in the manner described above. The composite operation unit 221 calculates $P_2$ in accordance with the formula (4), that is, $P_2 = P_0 + d_2 \times P_1$, based on the new term $d_2$ and the data in the registers 225 and 226 ($P_0$ and $P_1$ in this case). $P_1$ which has been stored in the register 226 is transferred to the register 225 and the newly calculated $P_2$ is loaded into the register 226. The discriminator 260 discriminates $P_2$ and if the number of effective digits of $P_2$ does not exceed m bits, the next term $d_3$ is calculated by the divider 211. Similarly, each time the divider 211 produces the term $d_i$, the composite operation unit 221 operates the data $d_i$ and the data $p_{i-2}$ and $P_{i-1}$ stored in the registers 225 and 226 in accordance with the formula (4).

Values "1" and "0" of $Q_{-1}$ and $Q_0$ defined by the formula (6) are loaded into the registers 235 and 236 as initial values, respectively. The composite operation unit 231 calculates $Q_i$ in accordance with the formula (5) based on the data stored in the registers 235 and 236. The composite operation unit 231 and the transfer circuit 239 are identical to the composite operation unit 221 and the transfer circuit 229, respectively, and hence the operations of those circuits are omitted. The 1/0 discriminator 270 determines whether high order (m+1) bits of $Q_i$ calculated by the composite operation unit 231 are all "0" or "1", and if they are not, that is, if the number of effective digits of $Q_i$ is larger than m bits, the composite operation unit 231 produces the "1" output 271. Thus, the calculation of the next term $d_{i+1}$ by the divider 211 is inhibited.

In this manner, the divider 211 sequentially calculates the terms $d_i$ (i=1, 2, ...), and each time the term $d_i$ is calculated, the numerator $P_i$ and the denominator $Q_i$ are calculated by the composite operation units 221 and 231. Further, each time the term $d_i$ is calculated, the residue $R_i$ is checked by the zero detector 250, and the 1/0 discriminators 260 and 270 determine whether high order (m+1) bits of $P_i$ and $Q_i$ are all "0" or "1". If all of the outputs of those circuits 250, 260 and 270 are "0" and therefore an output of OR gate 280 is "0", the next term $d_{i+1}$, the numerator $P_{i+1}$ and the denominator $Q_{i+1}$ are calculated. If the output of the zero detector 250 is "1" for the residue $R_i$, it means that the calculation of all terms of the continued fraction has been completed. Since the numerator $P_i$ and the denominator $Q_i$ corresponding to $d_i$ are stored in the registers 226 and 236, respectively, they are sent to the registers 225 and 235 by the transfer circuits 229 and 239. Low order m-bit portions $P_m$ and $Q_m$ of the registers 225 and 235 are outputted from the lines 285 and 295 as the numerator and denominator of the reduced rational number. On the other hand, if the output 251 of the zero detector 250 is "0" and at least one of the outputs 261 and 271 of the discriminators 260 and 270 for $P_i$ or $Q_i$ is "0" and therefore an output of OR gate 280 is "1", it means that the number of effective digits of one of $P_i$ and $Q_i$ exceeds m bits. In this case, the reduction is terminated and $P_{i-1}$ and $Q_{i-1}$ which have been calculated prior to $P_i$ or $Q_i$ are outputted as the numerator and denominator of the approximate rational number which takes place of the reduced fraction. As explained above, when $P_i$ and $Q_i$ are loaded into the registers 226 and 236, $P_{i-1}$ and $Q_{i-1}$ have been transferred to the registers 225 and 235, respectively. Accordingly, the low order m bits $P_m$ and $Q_m$ of those registers 225 and 235 are outputted to the lines 285 and 286 as the numerator and denominator of the approximate rational number, respectively.

In the present embodiment, since the composite operation units 221 and 231 operate in parallel, $P_i$ and $Q_i$ are calculated quickly. The divider 211 in the present embodiment may be a known divider which iterates subtraction to produce a quotient and a residue, and hence the detail thereof is omitted.

Figure 2:
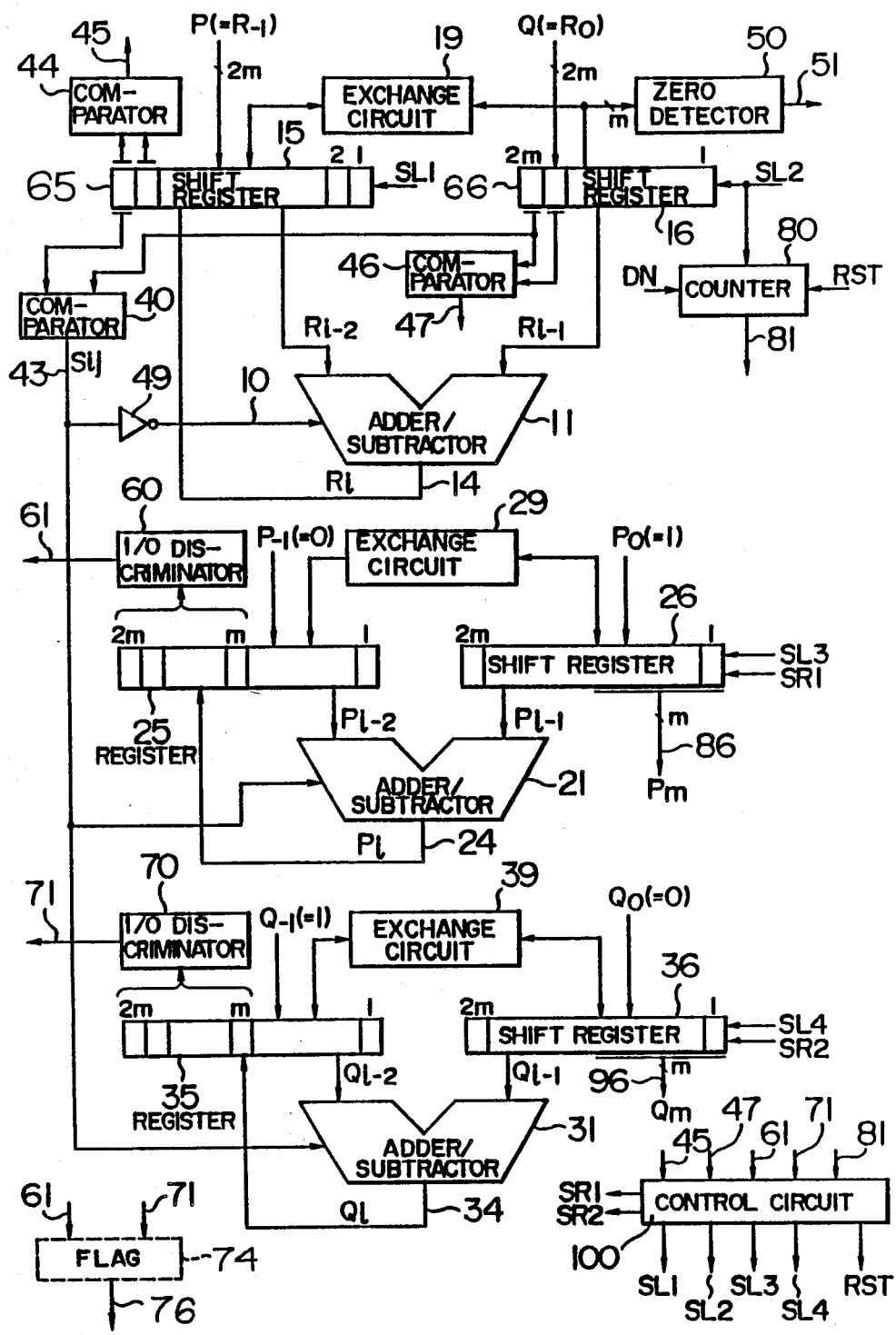
FIG. 2 shows a second embodiment of the rational number operation unit of the present invention.
Figure 3:
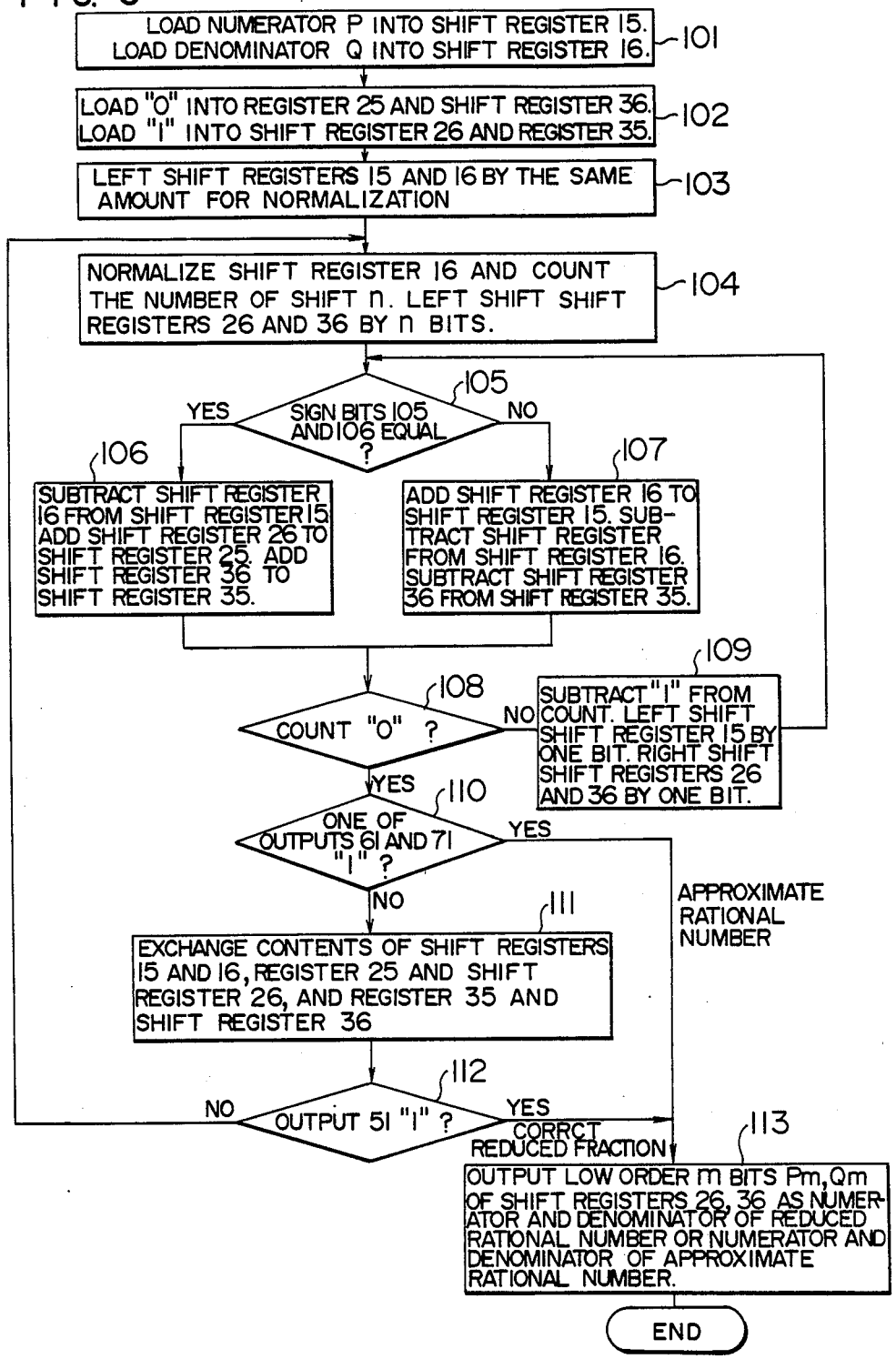
FIG. 3 shows a process flow chart of FIG. 2, FIGS. 4A and 4B show, in combination, a third embodiment of the present invention.

FIG. 2 shows a second embodiment of the present invention and FIG. 3 shows a flow chart of the operation. In the second embodiment, the division of the formula (7) and the operations of the formulas (4) and (5) can be carried out by a simple circuit at a high speed by determining not the term $d_i$ but other data S which is uniquely related to $d_i$.

In FIG. 2, numerals 15 and 16 denote 2m-bit shift registers, numeral 11 denotes an adder/subtractor, 14 denotes an output line thereof and numeral 19 denotes an exchange circuit for exchanging data of the shift registers 15 and 16.

Those elements are used to carry out the division of the formula (7) to obtain the terms $d_i (i=1, 2, \ldots)$ of the continued fraction.

Numeral 25 denotes a 2m-bit register, numeral 26 denotes a 2m-bit shift register, numeral 21 denotes an adder/subtractor 24 denotes an output line thereof and numeral 29 denotes an exchange circuit for exchanging data of the register 25 and the shift register 26. Those elements are used to determine the numerators $P_i (i=1, 2, \ldots)$ of the i-th approximate rational numbers $P_i/Q_i$ in accordance with the formula (4).

Numeral 35 denotes a 2m-bit register, numeral 36 denotes a 2m-bit shift register, numeral 31 denotes an adder/subtractor 34 denotes an output line thereof and numeral 39 denotes an exchange circuit for exchanging data of the register 35 and the shift register 36. Those elements are used to calculate the denominators $Q_i$ $(i=1, 2, \ldots)$ of the i-th approximate rational numbers $P_i/Q_i$ in accordance with the formula (5).

In the left shift mode of the shift registers 15, 16 and 26, 36, "0" is loaded to the right end, and in the right shift mode, the same bit as the sign bit (most significant bit) is loaded. Numeral 50 denotes a zero detector which determines if all bits of the shift register 16 are "0" or not, numeral 60 denotes a 1/0 discriminator which determines if high order (m+1) bits of the register 25 are all "0" or "1", numeral 70 denotes a 1/0 discriminator which determines if the high order (m+1) bits of the register 35 are all "0" or "1", numeral 40 denotes a comparator for comparing the most significant bits of the shift registers 15 and 16, that is, sign bits 65 and 66, and numeral 49 denotes an inverter which inverts the output of the comparator 40. Numeral 10 denotes an output of the inverter 49. Numerals 44 and 46 denote comparators which compare high order two bits of the shift registers 15 and 16, respectively, and numeral 80 denotes a counter which counds the number of left shift clocks SL2 applied to the shift register 16.

The process of operation is explained with reference to FIGS. 2 and 3.

(a) The numerator P and the denominator Q to be reduced in accordance with the formula (8) are loaded to the shift registers 15 and 16 as the initial values, respectively (step 101). Those numerator P and denominator Q are 2m-bit data. It is assumed that P and Q are not "0".

(b) Values "0" and "1" of $P_{-1}$ and $P_0$ determined by the formula (6) are loaded into the register 25 and the shift register 26 as the initial values, respectively, and values "1" and "0" of $Q_{-1}$ and $Q_0$ determined by the formula (6) are loaded into the register 35 and the shift register 36 as the initial values, respectively (step 102).

(c) In step 105–109, the division is carried out by using the adder/subtractor with the numerator P and denominator Q of the shift registers 15 and 16 as the dividend and divisor, respectively. In the present embodiment, the addition/subtraction is not carried out directly to the numerator P and denominator Q so that the number of times of addition/subtraction is minimized. That is, the addition/subtraction is carried out (n+1) times where n is a difference between the numbers of effective digits of P and Q. If the number of effective digits is smaller than that of Q, the addition/subtraction is carried out once. In a step 103, the following pre-processing is carried out to determine n.

The shift registers 15 and 16 are shifted left by the same amount so that the most significant bit of the effective bits of at least one of the data P and Q in the shift registers 15 and 16 reaches the leftmost position of the register. In other words, P or Q is normalized. The comparators 44 and 46 compares the most significant bit and the next more significant bit of the shift registers 15 and 16, respectively, and when they are equal, produce "1" outputs on the lines 45 and 47, respectively.

The control circuit 100 supplies left shift clocks SL1 and SL2 to the shift registers 15 and 16, respectively, when both the outputs 45 and 47 of the comparators 44 and 46 are "1" (that is, when the most significant bit 65 and the next more significant bit of the shift register 15 are equal and the most significant bit and the next more significant bit of the shift register 16 are equal). That is repeated until the most significant bit and the next more significant bit of one of the shift registers 15 and 16 differ from each other, that is, until one of P and Q is normalized. In this manner, the leading bit of one of P and Q which has a longer number of digits is brought to the most significant bit position of the shift register 15 or 16. The counter 80 counts the number 1 of left shift clocks SL2. After the normalization, the counter 80 is reset by the RST signal from the control circuit 100 and the count is no longer used.

(d) In a step 104, as the remaining process to determine the difference n of the numbers of digits of the data P and Q of the shift registers 15 and 16, the shift register 16 is shifted left until the data Q in the shift register 16 is normalized, that is, until the output 47 of the comparator 46 becomes "1". If the data P in the shift register 15 has been normalized in the previous step 103, the number of times of the left shift of the shift register 16 in the step 104 represents the difference between the numbers of digits of the data P and Q. If the data Q is normalized in the step 103, the number of times of left shift is "0". If the output 47 of the comparator 46 is still "1" after the normalization in the step 103, the control circuit 100 supplies the left shift clock SL2 to the shift register 16 until the output 47 changes to "0". The number n of the left shift clocks SL2 supplied to the shift register 16 in the step 104 is counted by the counter 80. In the step 104, the shift registers 26 and 36 are shifted left by the same amount as the left shift amount of the data in the shift register 16. To this end, the control circuit 100 supplies the left shift clocks SL3 and SL4 to the shift registers 26 and 36, respectively. The shift is done for digit alignment of multiplication which uses the quotient as a multiplier.

(e) In steps 105-111, division without add-back is carried out. This division per se has been known. Normally, data $S_i$ which is uniquely related to the quotient $d_i$ is first determined and then the quotient $d_i$ is determined. In the present embodiment, the quotient $d_i$ is not determined but the data $S_i$ is used to determine $P_i$ and $Q_i$ of the formulas (4) and (5). A principle of the division is explained below. In the division, the sign bits of the dividend and divisor are compared, and when they are equal, "1" is generated as the most significant bit of the data $S_i$, and if they are not equal, "0" is generated as the most significant bit of the data $S_i$. When the two sign bits are equal, the divisor is subtracted from the dividend, and when they are not equal, the divident and divisor are added, and the double of the difference or sum (left-shifted version) is used as a new dividend. The sign bit of the new dividend is compared with the original sign bit to determine the value of the second bit of the data $S_i$ in the same manner. Similarly, the bits of the data $S_i$ are sequentially determined. In the present embodiment, the addition/subtraction is carried out (n+1) times for the left shift count n counted by the counter 80 in the step 104. Accordingly, the data $S_i$ consists of (n+1) bits. When the above division is applied to the division of the formula (7), bit sequence $S_{in}$, $S_{in-1}$, ... $S_{i0}$ is obtained instead of the quotient $d_i$.

When $q_j = 2S_{ij} - 1$ (j=0, 1, 2, ... n), $q_j$ is 1 or −1 depending on whether $S_{ij}$ is 1 or 0. The quotient $d_i$ is represented by $q_j$ as follows.

$$d_i = q_n \times 2^n + q_{n-1} \times 2^{n-1} + \ldots + q_1 \times 2 + q_0.$$

It is thus seen that the quotient $d_i$ is uniquely related to the data $S_i$. When the bits $S_{in}$, $S_{in-1}$, ... $S_{i0}$ of the data $S_i$ are determined instead of the bits of $d_i$, the operation of the formula (4) is carried out in the following manner. As described in the step 104, the shift register 26 is shifted left by n bits to multiply $P_{i-1}$ by a factor of $2^n$. If $S_n=1$, then $q_n=1$ and $P_{i-2}$ and $P_{i-1}$ are added. If $S_n=0$, the $q_n=-1$ and $P_{i-1}$ is subtracted from $P_{i-2}$ to produce a new $P_{i-2}$. In this manner, $P_{i-2} + q_n \times 2^n \times P_{i-1}$ is obtained. Then, $P_{i-1}$ is multiplied by a factor of ½ (that is, $P_{i-1}$ is shifted right by one bit) to produce a new $P_{i-1}$, and a value of the next bit $S_{in-1}$ of the data $S_i$ is determined based on the new $P_{i-2}$ and the new $P_{i-1}$. Depending on whether this value is "0" or "1", the new $P_{i-1}$ is added to the new $P_{i-2}$ or the new $P_{i-1}$ is subtracted from the new $P_{i-2}$. In this manner, $P_{i-2} + q_n \times 2^n \times P_{i-1} + q_{n-1} \times 2^{n-1} \times P_{i-1}$ is obtained, where $P_{i-2}$ and $P_{i-1}$ are the original $P_{i-2}$ and $P_{i-1}$ prior to the additional/subtraction. The above operation is repeated and $P_i$ defind by the formula (4) is finally produced. The operation by the formula (5) is similarly carried out.

Turning back to FIG. 2, the procedures of the division and the calculation of $P_i$ and $Q_i$ are explained.

In the step 105, the comparator 40 compares the sign bits (most significant bits 105 and 106) of the shift registers 15 and 16. The output 43 of the comparator 40 is the bit $S_{ij}$ ($S_{1n}$ in this example). The output 43 is inverted by the inverter 49 and it is applied to the adder/subtractor 11 as the control signal 10. The output 43 is applied to the adder/subtractors 21 and 31 as the control signal. Those adder/subtractors 11, 21 and 31 adds or subtracts depending on whether the control signal thereto is "1" or "0". Accordingly, when the output 43 of the comparator 40 ($S_{1n}$ in the case) is "1", a step 106 is carried out. The adder/subtractor 11 subtracts the data in the shift register 16 from the data in the shift register 15 and stores the resulting data into the shift register 15. The adder/subtractor 21 adds the data in the register 25 and the shift register 26 and stores the resulting data into the register 25. Similarly, the adder/subtractor 31 adds the data in the register 35 and the shift register 36 and stores the resulting data into the register 35. On the other hand, if the output 43 of the comparator 40 ($S_{in}$ in this case) is "0", a step 107 is carried out. The adder/subtractors 11, 21 and 31 adds, subtracts and subtracts the data of those registers, respectively. In this manner, the bit $S_{in}$ is processed.

(f) At this stage, the control circuit 100 checks if the count 81 of the counter 80 is no less than "0" (step 108).

(g) If the count is less than "0", the control circuit 100 sends a count-down signal DN to the counter 80 to decrement the count by one. It also supplies the left shift clock SL1 and the right shift clocks SR1 and SR2 to the shift registers 15, 26 and 36, respectively (step 109).

(h) The steps 105-109 are repeated. The repetition terminates when the count reaches "0". Thus, it is repeated (n+1) times.

In this manner, the division of the formula (7) is carried out with the data in the shift registers 15 and 16 as the dividend and divisor, respectively, and the residue $R_i$ ($R_1$ in this case) is produced in the shift register 15. The operations of the formulas (4) and (5) are carried out by the adder/subtractors 21 and 31, and $P_i$ ($P_1$ in this case) and $Q_i$ ($Q_1$ in this case) are produced in the registers 25 and 35. When the count 81 of the counter 80 reaches "0", the control circuit 100 checks by the outputs 61 and 71 of the 1/0 discriminators 60 and 70 whether the number of effective digits of the data in the register 25 or 35 ($P_1$ or $Q_1$ in this case) exceeds m. If the number of effective digits of the data in the register 25 or 35 ($P_1$ or $Q_1$ in this case) is smaller than m, at least high order (m+1) bits of those registers are equal to the leading bits (sign bits) of those registers. The 1/0 discriminator 60 produces the "1" output when the high order (m+1) bits of the register 25 is neither all "0" nor all "1". Similarly, the 1/0 discriminator 70 produces the "1" output when the high order (m+1) bits in the register 35 is neither all "0" nor all "1". The control circuit 100 checks whether both of the outputs 61 and 71 of the 1/0 discriminators 60 and 70 are "0" (step 110). If they are not "0", the control circuit 100 judges that the number of effective digits of the data in the registers 25 and 35 ($P_1$ and $Q_1$ in this case) exceeds m and terminates the reducing operation. As a result, the low order m bits $P_m$ and $Q_m$ (1 and 0 in this case) of the shift registers 26 and 36 are outputted to the lines 86 and 96 as the numerator and denominator of the approximate rational number in place of the reduced fraction (step 113).

If the output 61 and 71 of the 1/0 discriminators 60 and 70 are both "0" in the step 110, it means that the number of effective digits of the data in the registers 25 and 35 ($P_1$ and $Q_1$ in this case) is smaller than m bits, and the reduction is continued.

In a step 111, the contents of the shift registers 15 and 16 are exchanged by the exchange circuit 19, the contents of the register 25 and the shift register 26 are exchanged by the exchange circuit 29, and the cntents of the register 35 and the shift register 36 are exchanged by the exchange circuit 39. In this manner, the denominator Q ($=R_0$) of the rational number to be reduced is loaded into the shift register 15, and the residue $R_1$ in the division in the steps 105–109 is loaded into the shift register 16. $P_0$ ($=1$) is loaded into the shift register 25 and the previously calculated $P_1$ is loaded into the shift register 26. $Q_0$ ($=0$) is loaded into the register 35 and the previously calculated $Q_1$ is loaded into the shift register 36.

The zero detector 50 detects whether the residue ($R_1$) in the shift register 16 is "0" or not, and if it is "0", produces the "1" output 51. If the residue ($R_1$) is "0", it means the end of reduction and the low order m bits $P_m$ and $Q_m$ of the shift registers 26 and 36 are outputted on the lines 86 and 96 as the numerator and denominator of the reduced rational number. In the present case, $P_1$ and $Q_1$ are outputted as the reduced fraction.

When the output of the zero detector 50 is "0", the residue ($R_1$) in the shift register 16 is not zero and the division to determine the next residue ($R_2$) by the formula (7) and the operation to determine the numerator ($P_2$) and the denominator ($Q_2$) of the next appropriate rational number by the formulas (4) and (5) are carried out in the same manner. The division with the data in the shift register 15 (the denominator Q of the rational number to be reduced) as the dividend and the residue ($R_1$) in the shift register 16 as the divisor is carried out by repeating the steps 104–109. As a result, the residue $R_2$ which is determined by the formula (7) ($R_2 = R_0 - d_2 R_1$ in the present case) is produced in the shift register 15 as the new residue. By repeatedly carrying out the steps 104–109, the numerator $P_2$ of the second approximate rational number determined by the relation of $P_2 = P_0 + d_2 P_1$ based on the data $S_2$ which is uniquely determined by the term $d_2$ supplied from the comparator 40, $P_0$ in the register 25 and $P_1$ in the shift register 26, is produced in the register 25. By repeatedly carrying out the steps 104–109, the denominator $Q_2$ of the second approximate rational number determined by the relation of $Q_2 = Q_0 + d_2 P_1$ based on the data $S_2$, $Q_0$ in the register 35 and $Q_1$ in the shift register 36, is produced in the register 35.

Thereafter, the decision in the step 110 is made, and if the number of bits of the effective digits of one of $P_2$ and $Q_2$ in the registers 25 and 35 exceeds m, the low order m bits $P_m$ and $Q_m$ of the shift registers 26 and 36 are outputted as the numerator and denominator of the approximate rational number for the rational number to be reduced. In the decision of the step 110, if the number of digits of any of $P_2$ and $Q_2$ does not exceed m, the step 111 is again carried out, and in the step 112, the residue $R_2$ is checked by the output 51 of the zero detector 50. If the residue $R_2$ is zero, the low order bits ($P_2$ and $Q_2$ in the present case) in the shift registers 26 and 36 are outputted as the reduced fraction. If the residue $R_2$ is not zero, the steps 104–112 are again carried out.

In this manner, the steps 104–112 are repeated until the residue of the division by the formula (7) reaches "0" or the number of effective digits of one of the numerator $P_i$ and the denominator $Q_i$ of the approximate rational number determined by the formulas (4) and (5) exceeds m bits.

Thus, the reduced fraction of the rational number P/Q or approximate rational number is obtained.

In the present embodiment, the data S which is uniquely defined by the quotient $d_i$ by the division without add-back is calculated by the adder/subtractor 11, starting from the most significant bit $S_{in}$. In the adder/subtractors 21 and 31, each time the bit $S_{ij}$ is calculated, a portion of the operation for $P_i$ or $Q_i$ by the formula (4) or (5) which depends on the bit $S_{ij}$ is immediately carried out without waiting for the calculation of the bits $S_{in}$–$S_{io}$ of the data $S_i$. Accordingly, while the next bit $S_{ij+1}$ of the data $S_i$ is calculated by the adder/subtractor 11, the portion of the operation for $P_i$ or $Q_i$ by the formula (4) or (5) which depends on $S_{ij}$ is concurrently calculated and $P_i$ and $Q_i$ are obtained at a high speed.

In the present embodiment, when the outputs of the 1/0 discriminators 60 and 70 are "1", the numerator and denominator of the approximate rational number are outputted. Alternatively, as shown by broken lines in FIG. 2, a flip-flop 74 which is set when the output of one of the discriminators 60 and 70 is "1" may be provided and the output 76 may be used as a flag signal to indicate whether the results $P_m$ and $Q_m$ is a correct reduced fraction or an approximate rational number.

Figure 4B:
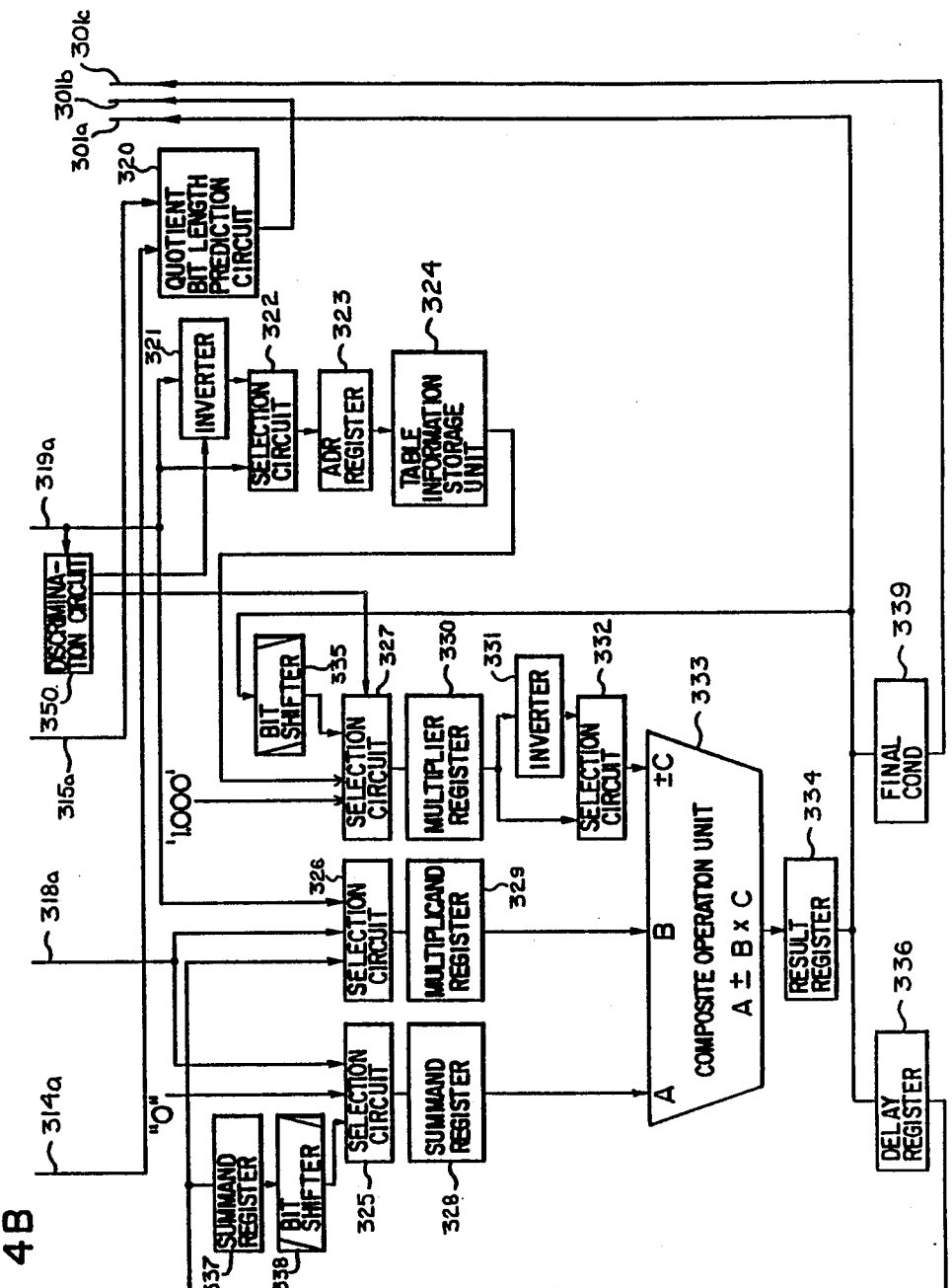
FIG. 4C shows an arrangement of FIGS. 4A and 4B.

FIGS. 4A and 4B show a third embodiment of the present invention. Numeral 301 denotes a control circuit which controls the entire rational number operation unit, numerals 302 to 307 denote selection circuits, numeral 308 denotes a dividend register, numeral 309 denotes an old numerator register, numeral 310 denotes an old denominator register, numeral 311 denotes a divisor register, numeral 312 denotes a new numerator register, numeral 313 denotes a new denominator register, numerals 314 and 315 respectively denote bit length detectors, numerals 316 and 317 denote selection circuits, numerals 318 and 319 denote bit shifters, numeral 320 denotes a quotient bit length prediction circuit, numeral 321 denotes an inverter, numeral 322 denotes a selection circuit, numeral 323 denotes a table address register, numeral 324 denotes a table information storage unit, numerals 325–327 selection circuits, numeral 328 denotes a summand register, numeral 329 denotes a multiplicand register, numeral 330 denotes a multiplier register, numeral 331 denotes an inverter, numeral 332 denotes a selection circuit, numeral 333 denotes a composite operation unit, numeral 334 denotes an operation result register, numeral 335 denotes a partial quotient bit shifter, numeral 336 denotes an operation result delay register, numeral 337 denotes a summand register, numeral 338 denotes a bit shifter, numeral 339 denotes an end of iteration condition detector, numeral 340 denotes a selection circuit, numeral 341 denotes a selection circuit, numeral 342 denotes a final numerator register, numeral 343 denotes a final denominator register, and numeral 350 denotes a discriminator for discriminating a bit sequence of a divisor normalized by the bit shifter 19.

The dividend register 8 and the divisor register 11 hold the residues $R_{i-2}$ and $R_{i-1}$ shown in the formula (7) as the dividend and divisor for determining the term $d_i$, respectively. The old numerator register 9 and the old denominator register 10 hold the numerator $P_{i-2}$ and the denominator $Q_{i-2}$ of the (i−2)th approximate fraction shown in the formulas (4) and (5), respectively. The new numerator register 12 and the new denominator register 13 hold the numerator $P_{i-1}$ and the denominator $Q_{i-1}$ of the (i−1)th approximate fraction shown in the formulas (4) and (5). The composite operation unit 33 carries out an operation of $A \pm B \times C$. In the present embodiment, one composition operation unit is selectively used to carry out the operations of the formulas (4) and (5). The division shown by the formula (7) is carried out by the composite operation unit 333 by using an approximate reciprocal in the table information storage unit 24.

(a') Before reduction, initial values are loaded into the registers 8–13 in the following manner. The numerator P of the rational number to be reduced is selected by the selection circuit 2, a constant "0" representing the initial value $P_{-1}$ is selected by the selection circuit 303 and a constant "1" representing the initial value $Q_{-1}$ is selected by the selection circuit 4, and they are loaded into the dividend register 308, old numerator register 309 and old denominator register 310, respectively. The denominator Q of the rational number to be reduced is selected by the selection circuit 305, a constant "1" representing the initial value $P_0$ is selected by the selection circuit 306 and a constant "0" representing the initial value $Q_0$ is selected by the selection circuit 307, and they are loaded into the divisor register 311, new numerator register 312 and new denominator register 313, respectively. The dividend register 308 and divisor register 311 are of 64-bit length, and the old numerator register 309, old denominator register 310, new numerator register 312 and new denominator register 313 are of 32-bit length. In the present embodiment, the numerals are binary integers represented by 2's complements.

(b') The effective bit length detection circuits 314 and 315 detect the effective bit lengths of the dividend $R_{i-2}$ and the divisor $R_{i-1}$ in the dividend register 308 and the divisor register 311, respectively. Numerals 314a and 315a represent outputs of the bit length detection circuits 314 and 315. The quotient bit length prediction circuit 320 checks if the signals represententing the effective bit lengths of the dividend $R_{i-2}$ and the divisor $R_{i-1}$ are zero or not and subtracts the effective bit length of the divisor $R_{i-1}$ from the effective bit length of the dividend $R_{i-2}$ and supplies the difference to the control circuit 1 as a predicted quotient bit length via line 301b. The effective bit length of the binary integer represented by 2's complement is equal to a difference between the bit length of the overall integer and a length of a continuous "0" bit sequence starting from the leading end when the integer is positive, and equal to a difference between the bit length of the overall integer and a length of a continuous "1" bit sequence starting from the leading end (plus one if there is no succeeding bit sequence (integer bit sequence comprises all "1") or if a succeeding bit sequence is all "0") when the integer is negative.

The control circuit 301 terminates the reducing operation if the effective bit length of the dividend or the divisor is zero, based on the information provided by the quotient bit length prediction circuit 320 after the setting of the initial values, and sends an interrupt signal to other device which constitutes a data processor not shown in FIG. 1. Similarly, if the difference between the effective bit lengths of the dividend and the divisor exceeds 32, it means that the numerator after the reduction is over 32 bits and an overflow occurs, and if the difference is smaller than $-32$, it means that the denominator after the reduction is over 32 bits and an underflow occurs. Thus, the control circuit 1 sends an interrupt signal to the other device and terminates the reducing operation.

(c') If the absolute value of the difference between the effective bit lengths of the dividend and the divisor is 31 or 32, the numerator or denominator after the reduction is within 32 bits or over 32 bits depending on the data of the dividend or the divisor. In the present embodiment, the end of iteration condition detection circuit 339 detects whether the effective bit length of the result of the first operation by the formula (4) exceeds 32 bits or not, and if it exceeds 32 bits, produces an overflow signal on line 301c. The final condition circuit 33g also detects whether the effective bit length of the result of the first operation by the formula (5) exceeds 32 bits or not, and if it exceeds, produces an underflow signal on line 301c. The control circuit 301 responds to these signal to terminate the reducing operation and send the interrupt signal to the other device.

(d') When the difference between the effective bit lengths of the dividend and the divisor is between $-32$ and 32, the following process is carried out. The dividend and the divisor in the registers 308 and 311 are selected by the selection circuits 316 and 317 and shifted left by the bit shifters 318 and 319 by the number necessary to bit mormalize the divisor when the difference between the effective bit lengths of the dividend and divisor is negative, or by the numbers necessary to bit-normalize the dividend and divisor respectively when the difference between the effective bit length of the dividend and divisor is zero or positive. In the bit-normalization, they are shifted left until the first and second bits become different from each other. Shift outputs of the bit shifters 318 and 319 are provided respectively on lines 318a and 319a.

(e') When the difference between the effective bit lengths of the dividend and divisor is negative, "0" is loaded into the multiplier register 330 by the selection circuit 327 without referring to the table information storage unit 324. When the difference between the effective bit lengths of the dividend and divisor is zero or positive, the following process is carried out. The discriminator 350 checks if all bits after the first bit of the divisor after the bit normalization are all "0" or not. If they are all "0", the selection circuit 327 selects a correct reciprocal ($=1.000$) of the divisor without referencing the table information storage unit 324 and it is loaded to the multiplier register 330. If the bits after the first bit of the divisor after the bit normalization is not all "0", the third to eleventh bits of the divisor if it is positive or the third to eleventh bits of the divisor if it is negative are inverted by the inverter 321 and the inverted bits are selected by the selection circuit 22 and loaded to the table address register 323 to refer the table information storage unit 324. The table information storage unit 324 stores approximate reciprocals of divisors. The quotient is correct up to 8 bits if the quotient does not overflow, and up to 9 bits if the quotient overflows.

Table 1 shows table storage information which meets the above condition. Nine bits determined by the bit-normalized divisor are used as the address. Each line includes 16 records and the leftmost three hexadecimal digits represent start address of the 16 records.

TABLE 1

| | | | | | | | | | | | | | | | | |
|---|---|---|---|---|---|---|---|---|---|---|---|---|---|---|---|---|
| 000: | FFE | FF0 | FE0 | FD0 | FC0 | FB0 | FA0 | F90 | F80 | F72 | F62 | F52 | F44 | F34 | F24 | F16 |
| 010: | F06 | EF8 | EE8 | EDA | ECC | EBC | EAE | E9E | E90 | E82 | E74 | E64 | E56 | E48 | E3A | E2C |
| 020: | E1E | E0E | E00 | DF2 | DE4 | DD6 | DCA | D8C | DAE | DA0 | D92 | D84 | D76 | D6A | D5C | D4E |
| 030: | D40 | D34 | D26 | D18 | D0C | CFE | CF2 | CE4 | CD8 | CCA | CBE | CB0 | CA4 | C96 | C8A | C7E |
| 040: | C70 | D64 | C58 | C4C | C3E | C32 | C26 | C1A | C0E | C00 | BF4 | BE8 | BDC | BD0 | BC4 | BB8 |
| 050: | BAC | BA0 | B94 | B88 | B7C | B70 | B64 | B5A | B4E | B42 | B36 | B2A | B20 | B14 | B08 | AFC |

TABLE 1-continued

| | | | | | | | | | | | | | | | |
|---|---|---|---|---|---|---|---|---|---|---|---|---|---|---|---|
| 060: | AF2 | AE6 | ADA | AD0 | AC4 | ABA | AAE | AA4 | A98 | A8C | A82 | A76 | A6C | A62 | A56 | A4C |
| 070: | A40 | A36 | A2C | A20 | A16 | A0C | A00 | 9F6 | 9EC | 9E2 | 9D6 | 9CC | 9C2 | 9B8 | 9AE | 9A2 |
| 080: | 998 | 98E | 984 | 97A | 970 | 966 | 95C | 952 | 948 | 93E | 934 | 92A | 920 | 916 | 90C | 902 |
| 090: | 8F8 | 8F0 | 8E6 | 8DC | 8D2 | 8C8 | 8BE | 8B6 | 8AC | 8A2 | 898 | 890 | 886 | 87C | 874 | 86A |
| 0A0: | 860 | 858 | 84E | 844 | 83C | 832 | 82A | 820 | 818 | 80E | 806 | 7FC | 7F4 | 7EA | 7E2 | 7D8 |
| 0B0: | 7D0 | 7C6 | 7BE | 7B4 | 7AC | 7A4 | 79A | 792 | 78A | 780 | 778 | 770 | 766 | 75E | 756 | 74E |
| 0C0: | 744 | 73C | 734 | 72C | 724 | 71A | 712 | 70A | 702 | 6FA | 6F2 | 6EA | 6E0 | 6D8 | 6D0 | 6C8 |
| 0D0: | 6C0 | 6B8 | 6B0 | 6A8 | 6A0 | 698 | 690 | 688 | 680 | 678 | 670 | 668 | 660 | 65A | 652 | 64A |
| 0E0: | 642 | 63A | 632 | 62A | 622 | 61C | 614 | 60C | 604 | 5FC | 5F6 | 5EE | 5E6 | 5DE | 5D8 | 5D0 |
| 0F0: | 5C8 | 5C2 | 5BA | 5B2 | 5AC | 5A4 | 59C | 586 | 580 | 578 | 570 | 56A | 562 | 55C | | |
| 100: | 554 | 54E | 546 | 540 | 538 | 532 | 52A | 524 | 51C | 516 | 50E | 508 | 500 | 4FA | 4F2 | 4EC |
| 110: | 4E4 | 4DE | 4D8 | 4D0 | 4CA | 4C2 | 4BC | 486 | 4AE | 4A8 | 4A2 | 49A | 494 | 48E | 488 | 480 |
| 120: | 47A | 474 | 46C | 466 | 460 | 45A | 452 | 44C | 446 | 440 | 43A | 432 | 42C | 426 | 420 | 41A |
| 130: | 414 | 40C | 406 | 400 | 3FA | 3F4 | 3EE | 3E8 | 3E2 | 3DC | 3D4 | 3CE | 3C8 | 3C2 | 3BC | 3B6 |
| 140: | 3B0 | 3AA | 3A4 | 39E | 398 | 392 | 38C | 386 | 380 | 37A | 374 | 36E | 368 | 362 | 35C | 356 |
| 150: | 352 | 34C | 346 | 340 | 33A | 334 | 32E | 328 | 322 | 31E | 318 | 312 | 30C | 306 | 300 | 2FC |
| 160: | 2F6 | 2F0 | 2EA | 2E4 | 2E0 | 2DA | 2D4 | 2CE | 2C8 | 2C4 | 2BE | 2B8 | 2B4 | 2AE | 2A8 | 2A2 |
| 170: | 29E | 298 | 292 | 28E | 288 | 282 | 27C | 278 | 272 | 26E | 268 | 262 | 25E | 258 | 252 | 24E |
| 180: | 248 | 242 | 23E | 238 | 234 | 22E | 22A | 224 | 21E | 21A | 214 | 210 | 20A | 206 | 200 | 1FC |
| 190: | 1F6 | 1F0 | 1EC | 1E6 | 1E2 | 1DC | 1D8 | 1D2 | 1CE | 1CA | 1C4 | 1C0 | 1BA | 1B6 | 1B0 | 1AC |
| 1A0: | 1A6 | 1A2 | 19E | 198 | 194 | 18E | 18A | 184 | 180 | 17C | 176 | 172 | 16E | 168 | 164 | 15E |
| 1B0: | 15A | 156 | | 14C | 148 | 142 | 13E | 130 | 134 | 12C | 126 | 122 | 11E | 11A | 114 | |
| 1C0: | 110 | 10C | 106 | 102 | 0FE | 0FA | 0F4 | 0F0 | 0EC | 0E8 | 0E4 | 0DE | 0DA | 0D6 | 0D2 | 0CC |
| 1D0: | 0C8 | 0C4 | 0C0 | 0BC | 0B6 | 0B2 | 0AE | 0AA | 0A6 | 0A2 | 09C | 098 | 094 | 090 | 08C | 088 |
| 1E0: | 084 | 07E | 07A | 076 | 072 | 06E | 06A | 066 | 062 | 05E | 058 | 054 | 050 | 04C | 048 | 044 |
| 1F0: | 040 | 03C | 038 | 034 | 030 | 02C | 028 | 024 | 020 | 01C | 018 | 014 | 010 | 00C | 008 | 004 |

The number of records in Table 1 is 512 which are addressable by a 9-bit binary number. The stored information of Table 1 comprises 9 address bits with "1" bit added next to the leftmost bit to form a 10-bit binary number which is used as a divisor having a radix point on the left of the leftmost "1" bit. A reciprocal of the divisor is calculated and 11 bit below the radix point of the reciprocal are represented by three hexadecimal digits. When the divisor is other than 0.800 in hexadecimal, an integer portion of the reciprocal of the divisor is always "1". When the divisor is equal to 0.800 in hexadecimal, the reciprocal of the divisor containing 11 bits below the radix point is represented by 1.EEE in hexadecimal. Since the integer portion is again "1", the stored information of Table 1 uses a fraction portion containing 11 bits below the radix point. The data outputted by the table information storage unit 324 has "1" added next to the leftmost bit thereof as an integer portion, and has 12th bit of the bit-normalized divisor, as counted from the top bit, added next to the rightmost bit, with inversion when the divisor is positive and without inversion when the divisor is negative. In this manner, a final approximate reciprocal is produced. In the multiplication in the composite operation unit 333, a multiple of a multiplicand by the multiplier is generated by a known Booth method. In multiplication using the Booth method, the rightmost bit of a multiplier is recorded as the weight of the one bit higher. In the present embodiment the 12th bit below the radix point is recorded as the weight of the 11th bit below the radix point. Accordingly, when the divisor is 0.8, the approximate reciprocal is 1.FFF but the composite operation unit 333 assumes it as 2 in executing the multiplication. The precision of the approximate reciprocal is determined by the method described in Japanese patent application 58-247646 (corresponding U.S. Ser. No. 687,912 issued as U.S. Pat. No. 4,707,798 on Nov. 17, 1987). Upper and lower limits of the divisor and approximate reciprocal are as follows.

Lower limit: 1 when the divisor is 0.8
Upper limit: 1.007F8 when the divisor is 0.808
Since the value is between 1 and $1+2^{-9}$, if the quotient is produced by multiplying the dividend by the approximate reciprocal of the divisor, 8 bits thereof when the quotient has no overflow or 9 bits thereof when the quatient has an overflow are equal to the true quotient, or the least significant bits to be compared is larger than the true one by "1".

A simple example of division is now explained. For $121 \div 11 = 11$ in decimal notation, the predicted bit length of the quotient is equal to $7-4=3$ in the present embodiment, the table address is 0C0, the final approximate reciprocal is 1.746 while taking the weight of $2^{-11}$ for the $2^{-12}$ order bit into account, the bit-normalized dividend is 7900000.000000000, and the product of the divisor and the approximate reciprocal is 0B001600000000000000. The radix point of the divisor is between the first and second bits, and the radix point of the approximate reciprocal is between the first and second digits in hexadecimal notation. Accordingly, the radix point of the product of the dividend and approximate reciprocal is between the first and second bits of the second digits represented by hexadecimal notation. This corresponds to the radix point when the effective bit lengths of the dividend and divisor are equal. Since the predicted effective bit length of the quotient is 3, the quotient is B is hexadecimal notation or 11 in decimal notation moving the radix point to the right by 3 bits.

(f') Simultaneously with the preparation of the approximate reciprocal of the divisor, an initial value of a partial residue is prepared in the following manner. After the bit-normalized divided has been selected by the selection circuit 325, it is loaded into the summand register 328. The bit shifter 335 is controlled to output "0" which is loaded into the multiplier register 330 through the selection circuit 327 and supplied to the composite operation unit 333 as a multiplier through the selection circuit 332. As a result, the bit-normalized dividend is outputted from the composite operation unit 333 as the operation result and it is loaded into the operation result register 334. The output 301a of the operation result register 334 is loaded into the operation result delay register 336 and then loaded into the summand register 337.

(g') A partial quotient is next calculated. The approximate reciprocal of the divisor calculated based on the bit-normalized divisor is loaded into the multiplier register 330 through the selection circuit 327. The selection circuit 325 selects "0" which is loaded to the summand register 328 and supplied to the composite operation unit as a summand. On the other hand, the selection circuit 326 selects the bit-normalized dividend outputted from the bit shifter 318, which is loaded into the multiplicand register 329 and supplied to the composite operation unit 333 as a multiplicand. The approximate reciprocal loaded into the multiplier register 330 is selected as it is by the selection circuit 332 when the divisor is positive, and the bit inversion of the approximate reciprocal by the inverter 331 is selected by the selection circuit 332 when the divisor is negative, and it is supplied to the composite operation unit 333 as a multiplier. As a result, the composite operation unit produces a product of the bit-normalized dividend and the approximate reciprocal of the divisor and it is loaded into the operation result register 334. Of the high order bits loaded into the operation result register 334, total of 12 bits consisting of three sign bits, one partial quotient overflow bit and eight partial quotient bits are supplied to the bit shifter 335, together with four low order "0" bits. The bit shifter 335 right-shifts by a difference between 8 and a residue produced when the predicted bit length of the quotient is divided by 8. The bit-shifted partial quotient is selected by the selection circuit 327 and loaded into the multiplier register 330.

(h') Thereafter, the calculations of the formulas (7), (4) and (5) are carried out. The bit shifter 338 left-shifts the partial residue ($=R_{i-2}$) stored in the summand register 337 as the summand by a residue produced when the predicted bit length of the quotient is divided by 8. The shifted result if loaded into the summand register 328 through the selection circuit 325 and supplied to the composite operation unit 333. The bit-normalized divisor ($=R_{i-1}$) supplied from the bit shifter 319 as the multiplicand is selected by the selection circuit 326 and loaded into the multiplicand register 329, and supplied to the composite operation unit 333. The partial quotient loaded into the multiplier register 330 is inverted by the inverter 331 and it is selected by the selection circuit 332, and supplied to the composite operation unit 333 as a multiplier. In this manner, the calculation of dividend ($=R_{i-2}$)−divisor ($=R_{i-1}$)×partial quotient ($=d_i$) in accordance with the formula (7) is carried out by the composite operation unit, and the result is loaded into the operation result register 334 as a partial residue.

(i') When the predicted bit length of the quotient is greater than 8, the division is further continued and the output of the operation result register 334 is loaded into the operation result delay register 336. When the predicted bit length of the quotient is 8 or less, the output of the operation result register 334 is selected by the selection circuit 305 and it is loaded into the divisor register 311 and the unupdated data in the divisor register 311 is selected by the selection circuit 302 and loaded into the dividend register 308.

(j') Then, the content $P_{i-2}$ of the old numerator register 309 is selected by the selector circuit 316 and it passed through the bit shifter 318 without shift, selected by the selection circuit 325 and loaded into the summand register 328. On the other hand, $P_{i-1}$ in the new numerator register 312 is selected by the selector circuit 317, and it is shifted left by the bit shifter 319 by the number equal to the binary number of the predicted bit length of the quotient with the low order three bit being cut away, and it is selected by the selection circuit 326 and loaded into the multiplicand register 329. The output of the multiplier register 330 is selected as it is by the selection circuit 332 as the multiplier. In this manner, the calculation in accordance with the formula (4) is carried out by the composite operation unit 333 and the result is loaded into the operation result register 334.

(k') When the predicted bit length of the quotient is greater than 8, the division is further continued and the output of the operation result register 334 is loaded into the operation result delay register 334. When the predicted bit length of the quotient is 8 or less, the output of the operation result register 334 is selected by the selection circuit 306 and loaded into the new numerator register 312, and the unupdated data of the new numerator register 312 is selected by the selection circuit 303 and loaded into the old numerator register 309.

Similarly, the output of the old denominator register 310 is selected by the selection circuit 316, passed through the bit shifter 318 without shift and it is selected by the selection circuit 325 and loaded into the summand register 328. On the other hand, the output of the new denominator register 313 is selected by the selector circuit 317, and it is shifted left by the bit shifter 319 by the same number of bits as that for the new numerator, and it is selected by the multiplicand register selection circuit 326 and loaded into the multiplicand register 329. The same multiplier as that for the old numerator and new numerator is used as it is. In this manner, the calculation in accordance with the formula (5) is carried out by the composite operation unit 333 and the result is loaded into the operation result register 334.

(l') When the predicted bit length of the quotient is greater than 8, the division is further continued and the output of the operation result register 334 is loaded into the operation result delay reigster 336. When the predicted bit length of the quotient is 8 or less, the output of the operation result register 334 is selected by the selection circuit 307 and loaded into the new denominator register 313. The unupdated data in the new denominator register 313 is selected by the selection circuit 304 and loaded into the old denominator register 310. If the predicted bit length of the quotient is greater than 8, the result of the formula (5) is loaded into the operation result register 334, the result of the formula (4) is loaded into the operation result delay register 336, and the result of the formula (7) is loaded into the multiplicand register 329 and the summand register 337.

(m') When the predicted bit length of the quotient is greater than 8, the above sequence of operations is repeated by a number of times which is dependent on the predicted length of the quotient. When the predicted length of the quotient is greater than 8, division of the quotient by 8 results in a non-zero quotient. The number of the repetitions is set to be equal to this quotient. Differences from the above sequence of operations are that the output of the operation result delay register 336 is selected as the multiplicand for calculating the partial quotient, the bit shifter 335 passes the partial quotient without shift, the partial residue is shifted left by 8 bits by the bit shifter 338 in the calculation of the formula (7), the summand register 337 is used as the summand in the calculation of the formulas (4) and (5) and it is passed through the bit shifter 338 without shift, and the number of left shift in the bit shifter 319 is sequentially decreased by 308. After the iteration of the above operation by the number of times equal to the quotient produced when the predicted bit length of the quotient is divided by 8, the dividend register 308, old numerator register 309, old denominator register 310, divisor register 311, new numerator register 312 and new denominator register 313 are updated in the same manner as that they are done when the predicted bit length of the quotient is 8 or less.

(n') Simultaneously with the update of those registers, the end of iteration condition is checked by the end of iteration detection circuit 339. If the end of iteration condition is not met, the iterative operation for the formulas (7), (4) and (5) is carried out. In the quotient bit length prediction in the second or subsequent iteration, the divisor loaded in the divisor register 311 is not always a bit-normalized one but it is of the same size as the bit-normalized version of the dividend loaded into the dividend register 308. Accordingly, the quotient bit length prediction circuit 320 does not use the output of the effective bit length detection circuit 314 but predicts the bit length of the quotient assuming that the dividend has already been bit-normalized. When the end of iteration condition is met, that is, when the partial residue is zero, the outputs $P_m$ and $Q_m$ of the new numerator register 312 and the new denominator register 313 are selected by the selection circuits 340 and 341, and when the result of iterative operation to the numerator or denominator exceeds 32 bits, the outputs of the old numerator register 309 and old denominator register 310 are selected by the selection circuits 340 and 341, and they are loaded into the final numerator register 342 and final denominator register 343.

An example of reduction in accordance with the present embodiment is explained. In the example, the numerator and denominator represented in hexadecimal notation are as follows.

Numerator: 0000000003681B4D
Denominator: 0000000001034661

In the eleventh iteration, $R_{11}$ is "0" and $P_m$ and $Q_m$ match to the initially given numerator and denominator, and the rational number operation unit of the present embodiment can determine that it is an irreducible fraction.

| 1st Iteration | | | | | |
|---|---|---|---|---|---|
| $R_{-1}$: | 0000000003681B4D | $R_o$: | 0000000001034661 | Effective bit length of dividend | 1B |
| $P_{-1}$: | 00000000 | $P_o$: | 00000001 | Effective bit length of division | 1A |
| $Q_{-1}$: | 00000001 | $Q_o$: | 00000000 | Predicted bit length of quotient | 01 |
| Table Address | 006 | Substantial Approx. Reciprocal | 1FA2 | | |
| | $R_{-1}$ × Approx. Reciprocal: | | 0D7865F3374000000000 | | |
| | $d_1$ | | 003.0 | | |
| | $R_{-1} - d_1 \times R_o$: | | 00017920A8000000000.0 | | |
| | $P_{-1} + d_1 \times P_o$: | | 0000000000000000003.0 | | |
| | $Q_{-1} + d_1 \times Q_o$: | | 0000000000000000001.0 | | |

| 2nd Iteration | | | | | |
|---|---|---|---|---|---|
| $R_o$: | 0000000001034661 | $R_1$: | 17920A8000000000 | Effective bit length of dividend | 3F |
| $P_o$: | 00000001 | $P_1$: | 00000003 | Effective bit length of division | 3D |
| $Q_o$: | 00000000 | $Q_1$: | 00000001 | Predicted bit length quotient | 02 |
| Table Address | 0F2 | Substantial Approx. Reciprocal | 1.5BC | | |
| | $R_o$ × Approx. reciprocal: | | 0580CB690F0000000000 | | |
| | $d_2$: | | 002.0 | | |
| | $R_o - d_2 \times R_1$: | | 00046B60D0000000000.0 | | |
| | $P_o + d_2 \times P_1$: | | 0000000000000007.0 | | |
| | $Q_o + d_2 \times Q_1$: | | 0000000000000002.0 | | |

Note: In second and subsequent iterations, the bit length of the dividend is fixed to 3F.

| 3rd Iteration | | | | | |
|---|---|---|---|---|---|
| $R_1$: | 17920A8000000000 | $R_2$: | 46B60D0000000000 | Effective bit length of dividend | 3F |
| $P_1$: | 00000003 | $P_2$: | 00000007 | Effective bit length of division | 3F |
| $Q_1$: | 00000001 | $Q_2$: | 00000002 | Predicted bit length of quotient | 00 |
| Table Address | 035 | Substantial Approx. Reciprocal | 1.CFE | | |
| | $R_1$ × Approx. Reciprocal: | | 0AAD7031AC0000000000 | | |
| | $d_3$: | | 001.0 | | |
| | $R_1 - d_3 \times R_2$: | | 00017921D0000000000.0 | | |
| | $P_1 + d_3 \times P_2$: | | 000000000000000000A.0 | | |

-continued

| 3rd Iteration | |
|---|---|
| $Q_1 + d_3 \times Q_2$: | 0000000000000000003.0 |

| 4th Iteration | | | | | |
|---|---|---|---|---|---|
| $R_2$: | 46B60D0000000000 | $R_3$: | 17921D0000000000 | Effective bit length of dividend | 3F |
| $P_2$: | 00000007 | $P_3$: | 0000000A | Effective bit length of division | 3D |
| $Q_2$: | 00000002 | $Q_3$: | 00000003 | Predicted bit length of quotient | 02 |
| Table Address | 0F2 | Substantial Approx. Reciprocal | 1.5BC | | |
| | $R_2 \times$ Approx. Reciprocal: | | 0600DCC28C0000000000 | | |
| | $d_4$: | | 002.0 | | |
| | $R_2 - d_4 \times R_3$: | | 0005E474C0000000000.0 | | |
| | $P_2 + d_4 \times P_3$: | | 0000000000000001B.0 | | |
| | $Q_2 + d_4 \times Q_3$: | | 0000000000000008.0 | | |

| 5th Iteration | | | | | |
|---|---|---|---|---|---|
| $R_3$: | 17921D0000000000 | $R_4$: | 5E474C0000000000 | Effective bit length of dividend | 3F |
| $P_3$: | 0000000A | $P_4$: | 0000001B | Effective bit length of division | 3D |
| $Q_3$: | 00000003 | $Q_4$: | 00000008 | Predicted bit length of quotient | 02 |
| Table Address | 0F2 | Substantial Approx. Reciprocal | 1.5BC | | |
| | $R_3 \times$ Approx. Reciprocal: | | 08012EB9300000000000 | | |
| | $d_5$: | | 001.0 | | |
| | $R_3 - d_5 \times R_4$: | | 0000001280000000000.0 | | |
| | $P_3 + d_5 \times P_4$: | | 000000000000000025.0 | | |
| | $Q_3 + d_5 \times Q_4$: | | 00000000000000000B.0 | | |

| 6th Iteration - (1) | | | | | |
|---|---|---|---|---|---|
| $R_4$: | 5E474C0000000000 | $R_5$: | 0001280000000000 | Effective bit length of dividend | 3F |
| $P_4$: | 0000001B | $P_5$: | 00000025 | Effective bit length of division | 31 |
| $Q_4$: | 00000008 | $Q_5$: | 0000000B | Predicted bit length of quotient | 0E |
| Table Address | 050 | Substantial Approx. Reciprocal | 1.BAE | | |
| | $R_4 \times$ Approx. Reciprocal: | | 0A319979A80000000000 | | |
| | $d_6$: | | 051.0 | | |
| | $R_4 - d_6 \times R_5$: | | 000027A300000000000.0 | | |
| | $P_4 + d_6 \times$ (8-bit left shift of $P_5$) | | 00000000000000BB51B.0 | | |
| | $Q_4 = d_6 \times$ (8-bit left shift of $Q_5$) | | 000000000000037B08.0 | | |

| 6th Iteration - (2) | |
|---|---|
| Up to substantial approximate reciprocal, the same as that of 6th iteration (1). | |
| $R_4' \times$ Approx. Reciprocal: | 044E526A000000000000 |
| $d_6'$: | 089.0 |

-continued

| 6th Iteration - (2) | |
|---|---|
| $R_4' - d_6' \times R_5$: | 00039000000000000000.0 |
| $P_4 + d_6' \times P_5$: | 00000000000000BC8E8.0 |
| $A_4 + d_6' \times Q_5$: | 000000000000000380EB.0 |

| 7th Iteration | | | | | |
|---|---|---|---|---|---|
| $R_5$: | 0001280000000000 | $R_6$: | 3900000000000000 | Effective bit length of dividend | 3F |
| $P_5$: | 00000025 | $P_6$: | 000BC8E8 | Effective bit length of division | 3E |
| $Q_5$: | 0000000B | $Q_6$: | 000380EB | Predicted bit length | |

-continued

7th Iteration

| | | | | |
|---|---|---|---|---|
| | | | of quotient | 01 |
| Table Address | 190 | Substantial Approx. Reciprocal | 1.1F8 | |
| $R_5 \times$ Approx. Reciprocal: | | | 0531B000000000000000 | |
| $d_7$ | | | 001.0 | |
| $R_5 - d_7 \times R_6$: | | | 000220000000000000.0 | |
| $P_5 + d_7 \times P_6$: | | | 00000000000000BC90D.0 | |
| $Q_5 + d_7 \times Q_6$: | | | 000000000000000380F6.0 | |

8th Iteration

| | | | | |
|---|---|---|---|---|
| $R_6$: | 3900000000000000 | $R_7$: | 2200000000000000 | Effective bit length of dividend 3F |
| $P_6$: | 000BC8E8 | $P_7$: | 000BC90D | Effective bit length of division 3E |
| $Q_6$: | 000380EB | $Q_7$: | 000380F6 | Predicted bit length of quotient 01 |
| Table Address | 020 | Substantial Approx. Reciprocal | 1.E20 | |
| $R_6 \times$ Approx. Reciprocal: | | | 0D6A4000000000000000 | |
| $d_8$: | | | 003.0 | |
| $R_6 - d_8 \times R_7$: | | | 000180000000000000.0 | |
| $P_6 + d_8 \times P_7$: | | | 00000000000002F240F.0 | |
| $Q_6 + d_8 \times Q_7$: | | | 00000000000000E03CD.0 | |

9th Iteration

| | | | | |
|---|---|---|---|---|
| $R_7$: | 2200000000000000 | $R_8$: | 1800000000000000 | Effective bit length of dividend 3F |
| $P_7$: | 000BC90D | $P_8$: | 002F240F | Effective bit length of division 3D |
| $Q_7$: | 00380F6 | $Q_8$: | 000E03CD | Predicted bit length of quotient 02 |
| Table Address | 100 | Substantial Approx. Reciprocal | 1.556 | |
| $R_7 \times$ Approx. Reciprocal: | | | 05AAD800000000000000 | |
| $d_9$: | | | 002.0 | |
| $R_7 - d_9 \times R_8$: | | | 000500000000000000000 | |
| $P_7 - d_9 \times P_8$: | | | 000000000006A112B.0 | |
| $Q_7 - d_9 \times Q_8$: | | | 00000000000001F8890.0 | |

10th Iteration

| | | | | |
|---|---|---|---|---|
| $R_8$: | 1800000000000000 | $R_9$: | 5000000000000000 | Effective bit length of dividend 3F |
| $P_8$: | 002F240F | $P_9$: | 006A112B | Effective bit length of division 3F |
| $Q_8$: | 000E03CD | $Q_9$: | 001F8890 | Predicted bit length of quotient 00 |
| Table Address | 080 | Substantial Approx. Reciprocal | 1.99A | |
| $R_8 \times$ Approx. Reciprocal: | | | 0999C000000000000000 | |
| $d_{10}$: | | | 001.0 | |
| $R_8 - d_{10} \times R_9$: | | | 0000000000000000000.0 | |
| $P_8 + d_{10} \times P_9$: | | | 000000000000099353A.0 | |
| $Q_8 + d_{10} \times Q_9$: | | | 0000000000002D8C5D.0 | |

11th Iteration

| | | | | |
|---|---|---|---|---|
| $R_9$: | 5000000000000000 | $R_{10}$: | 1000000000000000 | Effective bit length of dividend 3F |
| $P_9$: | 006A112B | $P_{10}$: | 0099353A | Effective bit length of division 3D |
| $Q_9$: | 001F8890 | $Q_{10}$: | 002D8C5D | Predicted bit length of quotient 02 |
| Table Address | 000 | Substantial Approx. | 2.000 | |

-continued

| 11th Iteration | |
|---|---|
| Reciprocal | |
| $R_9 \times$ Approx.: | 0A00000000000000000 |
| Reciprocal | |
| $d_{11}$: | 005.0 |
| $R_9 - d_{11} \times R_{10}$: | 0000000000000000000 ← $R_{11}$ |
| $P_9 + d_{11} \times P_{10}$: | 00000000000003681B40.0 ← $P_m$ |
| $Q_9 + d_{11} \times Q_{10}$: | 00000000000001034661.0 ← $Q_m$ |

The bit lengths of the registers are not limited to 64 and 32. In the present embodiment, all calculations are carried out by one composite operation unit. Alternatively, the composite operation unit may be divided into an adder and a multiplier. The rational number operation unit of the present invention may be constructed with a divider which does not use the table information storage unit.

A divider which concurrently calculates a plurality of bits of a quotient has been known. The second embodiment may be modified by using such a prior art divider. Since the modified embodiment does not essentially differ from the second embodiment, explanation similar portions to the second embodiment is omitted and only those portions which require explanation for the modification are described hereinafter. In the process (e) above, the addition or subtraction is carried out depending on the value of the output 43 of the comparator. Namely, when the sign bits of the shift registers 15 and 16 are equal, the data $S_{ij}$ mentioned for the process (e) is "+1", and when they are not equal, the data $S_{ij}$ is "0". This portion may be modified as follows. Several bit portion $d_{ij}$ (j=0, 1, 2, . . . ) of the quotient $d_i$ is produced based on high order several bits of the dividend and high order several bits of the divisor, according to a known method $d_{ij}R$ is subtracted from R, $d_{ij}P$ is added to P, and $d_{ij}Q$ is added to Q.

In the second embodiment, three adder/subtractors are used. Alternatively, one or two adder/subtractors may be selectively used.

When the rational number data represents not by 2's complement but by a sign and an absolute value is to be reduced, the data is expressed by 2's complement and it is supplied to the unit of FIG. 1 or FIG. 2, and the reduced fraction $P_m/Q_m$ outputted by the unit is converted to data represented by a sign and an absolute value.

We claim:

1. A rational number operation unit comprising:
divider means for sequentially calculating terms $d_1$, $d_2$, . . . or data $s_1$, $s_2$, . . . having a predetermined relation thereto of a continued fraction $$d_1 + \frac{1}{\lceil d_2 \rfloor} + \frac{1}{\lceil d_3 \rfloor} + \frac{1}{\lceil d_4 \rfloor} + \ldots$$

for a rational number to be reduced, defined by a fraction comprising a numerator and a denominator,
said divider means including means for carrying out first division with said numerator as a dividend and said denominator as a divisor, outputting a quotient thereof as the first term $d_1$ or related data $S_1$, carrying out (i+1)th division for each of different positive integers i's starting from i=1 with a residue of i-th division as a divisor and the divisor of the i-th division as a dividend, and outputting a quotient $d_{i+1}$ or related data $S_{i+1}$ as a result of the (i+1)th division;
calculation means connected to said divider means for calculating $P_i = P_{i-2} + d_i P_{i-1}$ $Q_i = Q_{i-2} + d_i Q_{i-1}$ where $P_i$ is a numerator and $Q_i$ is a denominator of i-th approximate fraction to the rational number, based on the quotient $d_i$ or data $S_i$ and previously calculated numerator $P_{i-2}$ and denominator $Q_{i-2}$ of the (i−2)th approximate fraction and numerator $P_{i-1}$ and denominator $Q_{i-1}$ of the (i−1)th approximate fraction, each time the term di or related data $S_i$ is calculated by said divider means; and
control means connected to said divider means so as to receive a residue of division carried out thereby each time said divider means carries out division for determining whether the residue of the division is zero or not, and when the residue is zero, outputting the numerator $P_i$ and denominator $Q_i$ of the i-th approximate fraction calculated by said calculation means as a reduced fraction of said rational number.

2. A rational number operation unit according to claim 1 wherein said control means includes means for determining whether at least one of the numerator $P_i$ and denominator $Q_i$ of the i-th approximate fraction calculated by said calculation means exceeds a predetermined number of digits and means responsive to an affirmative decision made by said determining means for one of the numerator $P_i$ and the denominator $Q_i$ for outputting previously calculated numerator $P_{i-1}$ and the denominator $Q_{i-1}$ of the (i−1) approximate fraction as a reduced fraction of said rational number.

3. A rational number operation unit according to claim 1 wherein said calculation means includes first means for calculating the numerator $P_i$ of the i−th approximate fraction to said rational number in accordance with the formula $P_i = P_{i-2} + d_i P_{i-1}$ based on the term $d_i$ or related data $S_i$ and previously calculated $P_{i-1}$ and $P_{i-2}$ each time the term $d_i$ or related data $S_i$ is calculated, and second means concurrently operable with said first means for calculating the denominator $Q_i$ of the i-th approximate fraction to said rational number in accordance with the formula $Q_i = Q_{i-2} + d_i Q_{i-1}$ based on the term $d_i$ or related data $S_i$ and previously calculated $Q_{i-1}$ and $Q_{i-2}$, each time the term $d_i$ or related data $S_i$ is calculated by said divider means.

4. A rational number operation unit according to claim 1 wherein said divider means includes first and second registers having the numerator and denominator to be reduced initially loaded thereinto, first operation means for executing one of subtraction and addition for the data in the first and second registers and storing the result thereof into said first register, said first operation means repeating one of the subtraction and addition until a residue of a division with the data in said first register as a dividend and the data in said second register as a divisor is produced in said first register, and each time said residue is produced, exchanging the data in said first register with the data in said second register and then repeating one of the subtraction and addition until a new residue of a division with the data in said first register as a dividend and the data in said second register as a divisor, and said calculation means includes third and fourth registers having predetermined initial values loaded thereinto, second operation means for adding or subtracting the data in said third and fourth registers and storing the result into said third register, said second operation means carrying out one of addition and subtraction in synchronism with the operation of one of subtraction and addition by said first operation means, exchanging the data in said third and fourth registers each time the division by said first operation means ends, further carrying out one of addition and subtraction in synchronism with further operation of one of subtraction and addition by said first operation means, so that the numerator $p_i$ of the i-th approximate rational number is produced in said third register each time i-th residue is produced by said divider means, fifth and sixth registers having predetermined initial values loaded thereinto, and third operation means for executing one of addition or subtraction for the data in said fifth and sixth registers and storing the result into said fifth register, said third operation means repeating the addition or subtraction in synchronism with the operation of one of subtraction and addition by said first operation means, exchanging the data in said fifth and sixth registers each time the division by said first operation means ends, carrying out further addition or substraction in synchronism with further operation of one of subtraction and addition by said first operation means so that the denominator $Q_i$ of the i-th approximate fraction is produced in said fifth register when the i-th residue is produced in said first register.

5. A rational number operation unit according to claim 1 wherein said calculation means includes operation means for outputting a sum of a product of first and second inputs, and a third input, and means for controlling the inputs to said operation means so the quotient $d_i$, the numerator $P_{i-1}$, and the numerator $P_{i-2}$ are supplied thereto as the first, second and third inputs thereto, respectively at one time after the quotient $d_i$ is calculated by said divider means and the quotient, the denominator $Q_{i-1}$ and the denominator $Q_{i-2}$ are supplied respectively at another time after calculation of the quotient $d_i$ so that $P_i$ and $Q_i$ are sequentially produced by said operation means.

6. A rational number operation unit according to claim 5 wherein said divider means includes first means for calculating a reciprocal of the divisor and means for calculating a product of the dividened and the reciprocal.

7. A rational number operation unit for reducing numerator and denominator of a rational number, comprising:

first data hold means for holding a dividend which is initially equal to the numerator;

second data hold means for holding a divisor which is initially equal to the denominator;

third data hold means for holding a numerator $P_{i-2}$ for an (i−2)th approximate fraction to the rational number which numerator is initially equal to a first initial data;

fourth data hold means for holding a numerator $P_{i-1}$ for an (i−1)th approximate fraction to the rational number, which numerator is initially equal to a second initial data;

fifth data hold means for holding a denominator $Q_{i-2}$ for the (i−2)th approximate fraction which denominator is initially equal to a third initial data;

sixth data hold means for holding a denominator $Q_{i-1}$ for the (i−1)th approximate fraction, which denominator is initially equal to a fourth initial data;

divider means for carrying out division of the dividend and divisor held in said first and second data hold means respectively, to produce quotient and residue;

first operation means for carrying out a first operation to calculate a numerator $P_i$ for an i-th approximate fraction of the rational number, the numerator $P_i$ being equal to a first sum of a product of the numerator $P_{i-1}$ held in said fourth data hold means and the quotient outputted by said divider means, and the numerator $P_{i-2}$ held in said third data hold means, each time division is carried out by said divider means;

second operation means for carrying out a second operation to calculate a denominator $Q_i$ for the i-th approximate fraction, the denominator $Q_i$ being equal to a second sum of a product of the denominator $Q_{i-1}$ held in said sixth data hold means and the quotient outputted by said divider means, and the denominator $Q_{i-2}$ held in said fifth data hold means, each time division is carried out by said divider means;

discrimination means responsive to the residue output by said division means for determining whether the residue is zero or not each time division is carried out by said divider means;

first transfer means for transferring the divisor held in said second data hold means to said first data hold means as a new dividend and transferring the residue outputted by said divider means to said second data hold means as a new divisor in response to execution of division by said divider means;

second transfer means for transferring the numerator $P_{i-1}$ held in the fourth data hold means to said third data hold means to be used as a new numerator $P_{i-2}$, transferring the numerator $P_i$ outputted by said first operation means to said fourth data hold means to be used as a new numerator $P_{i-1}$, transferring the denominator $Q_{i-1}$ held in said sixth data hold means to the fifth data hold means to be used as a new denominator $Q_{i-2}$, and transferring the denominator $Q_i$ outputted by said second operation means to said sixth data hold means to be used a new denominator $Q_{i-1}$, in response to the execution of the first and second operations by said first and second operation means;

means for ordering said divider means and first and second operation means to repeat division, the first operation and the second operation, respectively, in response to the determination of non-zero residue by said discrimination means; and, means for producing the first and second sums outputted by said first and second operation means as numerator and denominator of a reduced rational number in response to the determination of zero residue by said discrimination means.

8. A rational number operation unit according to claim 7 wherein said first and second operation means comprise operation means which sequentially carries out said first and second operations.

9. A rational number operation unit according to claim 7 wherein said first and second operation means for carrying out the first and second operations, respectively, concurrently.

10. A rational number operation unit according to claim 7 further comprising:
  detection means connected to said first and second operation means to detect when the number of effective digits of one of the first and second sums exceeds a predetermined number; and
  means responsive to the detection output of said detection means for outputting the data held in said third and fifth data hold means as numerator and denominator of a simple approximate rational number for the given rational number.

* * * * *

UNITED STATES PATENT AND TRADEMARK OFFICE
CERTIFICATE OF CORRECTION

PATENT NO. : 4,881,193
DATED : November 14, 1989
INVENTOR(S) : Hozumi Hamada, et al.

It is certified that error appears in the above-identified patent and that said Letters Patent is hereby corrected as shown below:

Claim 2, column 28, line 46, "(i-1)" should be --(i-1)th--.

Claim 7, column 30, line 58, before "a new" please insert --as--.

Signed and Sealed this

Fifth Day of March, 1991

*Attest:*

HARRY F. MANBECK, JR.

*Attesting Officer*   *Commissioner of Patents and Trademarks*